(12) United States Patent  
Jaganathan et al.

(10) Patent No.: US 12,011,686 B2  
(45) Date of Patent: **\*Jun. 18, 2024**

(54) FILTER MEDIA COMPRISING A PRE-FILTER LAYER

(71) Applicant: Hollingsworth & Vose Company, East Walpole, MA (US)

(72) Inventors: Sudhakar Jaganathan, Northborough, MA (US); Nagendra Anantharamaiah, Acton, MA (US); Maxim Silin, Hudson, MA (US)

(73) Assignee: Hollingsworth & Vose Company, East Walpole, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,721

(22) Filed: May 12, 2023

(65) Prior Publication Data

US 2024/0042367 A1  Feb. 8, 2024

Related U.S. Application Data

(63) Continuation of application No. 17/475,458, filed on Sep. 15, 2021, now Pat. No. 11,684,885, which is a (Continued)

(51) Int. Cl.
  *B01D 53/22* (2006.01)
  *A41D 13/11* (2006.01)
  (Continued)

(52) U.S. Cl.
  CPC .............. *B01D 46/62* (2022.01); *A41D 13/11* (2013.01); *B01D 39/1623* (2013.01);
  (Continued)

(58) Field of Classification Search
  CPC ............ B01D 39/1692; B01D 2275/10; B01D 2239/065; B01D 2239/1233;
  (Continued)

(56) References Cited

U.S. PATENT DOCUMENTS

| | | |
|---|---|---|
| 4,033,881 A | 7/1977 | Pall |
| 4,188,197 A | 2/1980 | Amberkar et al. |

(Continued)

FOREIGN PATENT DOCUMENTS

| | | |
|---|---|---|
| CN | 1040328 A | 3/1990 |
| CN | 100382876 C | 4/2008 |

(Continued)

OTHER PUBLICATIONS

International Search Report and Written Opinion for Application No. PCT/US2015/066728 mailed Feb. 23, 2016.

*Primary Examiner* — Anthony R Shumate
(74) *Attorney, Agent, or Firm* — Wolf, Greenfield & Sacks, P.C.

(57) ABSTRACT

Filter media comprising a pre-filter layer and related components, systems, and methods associated therewith are provided. In some embodiments, the pre-filter layer may be designed to impart desirable properties to the filter media, such as a high gamma and/or long service life, while having relatively minimal or no adverse effects on another property of the filter media that is important for a given application. For instance, a pre-filter layer may be used to improve the upstream removal of fine particulate matter, which may clog a downstream efficiency layer comprising submicron fibers and reduce filtration performance. The pre-filter layer may be configured to increase service life and/or increase the gamma of the filter media. Filter media, as described herein, may be particularly well-suited for applications that involve filtering air, though the media may also be used in other applications.

20 Claims, 5 Drawing Sheets

Related U.S. Application Data continuation of application No. 16/504,835, filed on Jul. 8, 2019, now Pat. No. 11,167,232, which is a continuation of application No. 14/577,247, filed on Dec. 19, 2014, now Pat. No. 10,343,095.

(51) Int. Cl.

| | | |
|---|---|---|
| *B01D 39/16* | (2006.01) | |
| *B01D 46/52* | (2006.01) | |
| *B01D 46/54* | (2006.01) | |
| *B01D 46/62* | (2022.01) | |
| *A62B 23/02* | (2006.01) | |

(52) U.S. Cl.
CPC ....... *B01D 39/1692* (2013.01); *B01D 46/521* (2013.01); *B01D 46/543* (2013.01); *A62B 23/02* (2013.01); *A62B 23/025* (2013.01); *B01D 2239/0622* (2013.01); *B01D 2239/0631* (2013.01); *B01D 2239/065* (2013.01); *B01D 2239/1233* (2013.01); *B01D 2275/10* (2013.01)

(58) Field of Classification Search
CPC ............... B01D 39/1623; B01D 46/62; B01D 2239/0631; B01D 2239/0622; B01D 46/543; B01D 46/521; A62B 23/025; A62B 23/02; A41D 13/11
See application file for complete search history.

(56) References Cited

U.S. PATENT DOCUMENTS

| | | |
|---|---|---|
| 4,622,259 A | 11/1986 | McAmish et al. |
| 4,925,601 A | 5/1990 | Vogt et al. |
| 5,108,827 A | 4/1992 | Gessner |
| 5,135,719 A | 8/1992 | Hillman et al. |
| 5,178,931 A | 1/1993 | Perkins et al. |
| 5,238,474 A | 8/1993 | Kahlbaugh et al. |
| 5,290,446 A | 3/1994 | Degen et al. |
| 5,306,321 A | 4/1994 | Osendorf |
| 5,350,620 A * | 9/1994 | Sundet ..................... D04H 1/42 55/DIG. 39 |
| 5,401,446 A | 3/1995 | Tsai et al. |
| 5,496,507 A | 3/1996 | Angadjivand et al. |
| 5,580,459 A | 12/1996 | Powers et al. |
| 5,620,785 A | 4/1997 | Watt et al. |
| 5,647,881 A | 7/1997 | Zhang et al. |
| 5,672,188 A | 9/1997 | Choi |
| 5,672,399 A | 9/1997 | Kahlbaugh et al. |
| 5,783,503 A | 7/1998 | Gillespie et al. |
| 5,785,725 A | 7/1998 | Cusick et al. |
| 5,804,512 A | 9/1998 | Lickfield et al. |
| 5,935,303 A * | 8/1999 | Kimura .............. B01D 39/1615 55/528 |
| 5,935,883 A | 8/1999 | Pike |
| 5,955,174 A | 9/1999 | Wadsworth et al. |
| 5,993,501 A | 11/1999 | Cusick et al. |
| 6,068,799 A | 5/2000 | Rousseau et al. |
| 6,099,729 A | 8/2000 | Cella et al. |
| 6,123,752 A | 9/2000 | Wu et al. |
| 6,171,369 B1 | 1/2001 | Schultink et al. |
| 6,171,684 B1 | 1/2001 | Kahlbaugh et al. |
| 6,193,773 B1 | 2/2001 | Schlor et al. |
| 6,261,979 B1 | 7/2001 | Tanaka et al. |
| 6,267,252 B1 | 7/2001 | Amsler |
| 6,302,934 B1 | 10/2001 | Nabata et al. |
| 6,309,438 B1 | 10/2001 | Kanno et al. |
| 6,315,806 B1 | 11/2001 | Torobin et al. |
| 6,372,004 B1 | 4/2002 | Schultink et al. |
| 6,391,075 B1 | 5/2002 | Meiji et al. |
| 6,416,562 B1 | 7/2002 | Shibuya et al. |
| 6,428,610 B1 | 8/2002 | Tsai et al. |
| 6,521,321 B2 | 2/2003 | Kahlbaugh et al. |
| 6,554,881 B1 | 4/2003 | Healey |
| 6,579,350 B2 | 6/2003 | Doherty |
| 6,627,563 B1 | 9/2003 | Huberty |
| H2086 H | 10/2003 | Amsler |
| 6,743,273 B2 | 6/2004 | Chung et al. |
| 6,746,517 B2 | 6/2004 | Benson et al. |
| 6,858,057 B2 | 2/2005 | Healey |
| 6,872,311 B2 | 3/2005 | Koslow |
| 6,872,431 B2 | 3/2005 | Kahlbaugh et al. |
| 6,924,028 B2 | 8/2005 | Chung et al. |
| 6,936,554 B1 | 8/2005 | Singer et al. |
| 6,955,775 B2 | 10/2005 | Chung et al. |
| 6,986,804 B2 | 1/2006 | Dominiak et al. |
| 7,008,465 B2 | 3/2006 | Graham et al. |
| 7,070,640 B2 | 7/2006 | Chung et al. |
| 7,097,694 B1 | 8/2006 | Jaroszczyk et al. |
| 7,137,510 B1 | 11/2006 | Klein et al. |
| 7,144,533 B2 | 12/2006 | Koslow |
| 7,163,625 B1 | 1/2007 | Williamson et al. |
| 7,179,317 B2 | 2/2007 | Chung et al. |
| 7,235,122 B2 | 6/2007 | Bryner et al. |
| 7,314,497 B2 | 1/2008 | Kahlbaugh et al. |
| 7,316,723 B2 | 1/2008 | Chung et al. |
| 7,318,852 B2 | 1/2008 | Chung et al. |
| 7,390,760 B1 | 6/2008 | Chen et al. |
| 7,754,123 B2 | 7/2010 | Verdegan et al. |
| 7,789,930 B2 | 9/2010 | Ensor et al. |
| 7,922,959 B2 | 4/2011 | Jones et al. |
| 7,927,540 B2 | 4/2011 | Smithies et al. |
| 7,998,885 B2 | 8/2011 | Conley et al. |
| 8,029,588 B2 | 10/2011 | Chung et al. |
| 8,147,583 B2 | 4/2012 | Gebert et al. |
| 8,172,092 B2 | 5/2012 | Green et al. |
| 8,308,834 B2 | 11/2012 | Smithies et al. |
| 8,357,220 B2 | 1/2013 | Guimond et al. |
| 8,361,180 B2 | 1/2013 | Lim et al. |
| 8,366,797 B2 | 2/2013 | Chung et al. |
| 8,545,587 B2 | 10/2013 | Guimond et al. |
| 8,950,587 B2 | 2/2015 | Thomson et al. |
| 9,457,322 B2 | 10/2016 | Choi et al. |
| 9,950,284 B2 | 4/2018 | Thomson et al. |
| 10,343,095 B2 | 7/2019 | Jaganathan et al. |
| 10,682,595 B2 | 6/2020 | Thomson et al. |
| 11,167,232 B2 | 11/2021 | Jaganathan et al. |
| 11,684,885 B2 | 6/2023 | Jaganathan et al. |
| 2001/0003082 A1 | 6/2001 | Kahlbaugh et al. |
| 2002/0013112 A1 | 1/2002 | Bontaites et al. |
| 2002/0083837 A1 | 7/2002 | Doherty |
| 2002/0170434 A1 | 11/2002 | Kawano et al. |
| 2002/0193553 A1 | 12/2002 | Qin et al. |
| 2003/0003834 A1 | 1/2003 | Berrigan et al. |
| 2003/0094102 A1 | 5/2003 | Maeoka et al. |
| 2003/0106294 A1 | 6/2003 | Chung et al. |
| 2003/0168401 A1 | 9/2003 | Koslow |
| 2003/0177909 A1 | 9/2003 | Koslow |
| 2003/0196963 A1 | 10/2003 | Koslow |
| 2003/0196964 A1 | 10/2003 | Koslow |
| 2003/0201231 A1 | 10/2003 | Koslow |
| 2003/0203696 A1 | 10/2003 | Healey |
| 2003/0205529 A1 | 11/2003 | Koslow |
| 2003/0205530 A1 | 11/2003 | Koslow |
| 2003/0205531 A1 | 11/2003 | Koslow |
| 2003/0211802 A1 | 11/2003 | Keck et al. |
| 2003/0213750 A1 | 11/2003 | Koslow |
| 2003/0226792 A1 | 12/2003 | Tumbrink et al. |
| 2004/0011362 A1 | 1/2004 | Angadjivand et al. |
| 2004/0060268 A1 | 4/2004 | Chung et al. |
| 2004/0060269 A1 | 4/2004 | Chung et al. |
| 2004/0083695 A1 | 5/2004 | Schultink et al. |
| 2004/0112023 A1 | 6/2004 | Choi |
| 2004/0118765 A1 | 6/2004 | Yavorsky et al. |
| 2004/0123572 A1 | 7/2004 | Chung et al. |
| 2004/0163540 A1 | 8/2004 | Mori et al. |
| 2004/0168417 A1 | 9/2004 | Tanaka et al. |
| 2004/0187454 A1 | 9/2004 | Chung et al. |
| 2004/0211160 A1 | 10/2004 | Rammig et al. |
| 2004/0255783 A1 | 12/2004 | Graham et al. |
| 2004/0266300 A1 | 12/2004 | Isele et al. |
| 2005/0079379 A1 | 4/2005 | Wadsworth et al. |
| 2005/0109393 A1 | 5/2005 | Anderson |
| 2005/0109554 A1 | 5/2005 | Ishikawa et al. |

(56) References Cited

U.S. PATENT DOCUMENTS

| | | |
|---|---|---|
| 2005/0109557 A1 | 5/2005 | Dravet et al. |
| 2005/0136292 A1 | 6/2005 | Mariani et al. |
| 2005/0148261 A1 | 7/2005 | Close et al. |
| 2005/0193696 A1 | 9/2005 | Muller et al. |
| 2005/0240517 A1 | 10/2005 | Wolzenski et al. |
| 2005/0241598 A1 | 11/2005 | Ezaki |
| 2005/0250726 A1 | 11/2005 | Krieg et al. |
| 2005/0266760 A1 | 12/2005 | Chhabra et al. |
| 2006/0096260 A1 | 5/2006 | Bryner et al. |
| 2006/0096263 A1* | 5/2006 | Kahlbaugh ........ B01D 39/2089 55/528 |
| 2006/0137317 A1 | 6/2006 | Bryner et al. |
| 2006/0137318 A1 | 6/2006 | Lim et al. |
| 2006/0277877 A1 | 12/2006 | Shields |
| 2006/0292947 A1 | 12/2006 | LaVietes et al. |
| 2007/0039300 A1 | 2/2007 | Kahlbaugh et al. |
| 2007/0054579 A1 | 3/2007 | Baker et al. |
| 2007/0056256 A1* | 3/2007 | Tepper ...................... A61L 9/16 55/527 |
| 2007/0074628 A1 | 4/2007 | Jones et al. |
| 2007/0075015 A1 | 4/2007 | Bates et al. |
| 2007/0084786 A1 | 4/2007 | Smithies |
| 2007/0125700 A1 | 6/2007 | Ding et al. |
| 2007/0190319 A1 | 8/2007 | Kalayci |
| 2007/0220852 A1 | 9/2007 | Lifshutz et al. |
| 2007/0264520 A1 | 11/2007 | Wood et al. |
| 2007/0271883 A1 | 11/2007 | Chung et al. |
| 2007/0283808 A1 | 12/2007 | Chung et al. |
| 2008/0017038 A1 | 1/2008 | Wu |
| 2008/0026041 A1* | 1/2008 | Tepper ................. D04H 1/4209 502/103 |
| 2008/0026661 A1 | 1/2008 | Fox et al. |
| 2008/0029449 A1 | 2/2008 | Dewaele et al. |
| 2008/0032110 A1 | 2/2008 | Wood et al. |
| 2008/0060328 A1 | 3/2008 | Devine |
| 2008/0073296 A1 | 3/2008 | Dema et al. |
| 2008/0105626 A1 | 5/2008 | Jones et al. |
| 2008/0108265 A1 | 5/2008 | Pourdeyhimi et al. |
| 2008/0110822 A1 | 5/2008 | Chung et al. |
| 2008/0134652 A1 | 6/2008 | Lim et al. |
| 2008/0160856 A1 | 7/2008 | Chen et al. |
| 2008/0202078 A1 | 8/2008 | Healey et al. |
| 2008/0302074 A1 | 12/2008 | Gebert et al. |
| 2008/0302242 A1 | 12/2008 | Schelling et al. |
| 2008/0314009 A1 | 12/2008 | Ziebold et al. |
| 2009/0044702 A1 | 2/2009 | Adamek et al. |
| 2009/0120048 A1* | 5/2009 | Wertz ................. B01D 39/1623 55/522 |
| 2009/0120868 A1 | 5/2009 | Huppchen et al. |
| 2009/0249956 A1 | 10/2009 | Chi et al. |
| 2009/0266048 A1 | 10/2009 | Schwarz |
| 2009/0272084 A1 | 11/2009 | Healey et al. |
| 2010/0000411 A1* | 1/2010 | Wertz ................. B01D 39/1623 55/486 |
| 2010/0107881 A1 | 5/2010 | Healey et al. |
| 2010/0116138 A1 | 5/2010 | Guimond et al. |
| 2010/0186595 A1 | 7/2010 | Huang |
| 2010/0187171 A1 | 7/2010 | Gupta |
| 2010/0187712 A1 | 7/2010 | Gupta et al. |
| 2010/0206803 A1 | 8/2010 | Ward et al. |
| 2010/0212273 A1 | 8/2010 | Schultink et al. |
| 2010/0218470 A1 | 9/2010 | Schultink et al. |
| 2010/0252510 A1 | 10/2010 | Godsay et al. |
| 2010/0307119 A1 | 12/2010 | Leung et al. |
| 2011/0079553 A1 | 4/2011 | Thomson et al. |
| 2011/0146490 A1 | 6/2011 | Derstler et al. |
| 2011/0147976 A1 | 6/2011 | Wertz et al. |
| 2011/0159765 A1* | 6/2011 | Fukasawa .......... D04H 1/43838 442/268 |
| 2012/0017763 A1 | 1/2012 | Velpari et al. |
| 2012/0067220 A1 | 3/2012 | Velpari et al. |
| 2012/0067814 A1 | 3/2012 | Guimond et al. |
| 2012/0152824 A1 | 6/2012 | Cox et al. |
| 2014/0060762 A1 | 3/2014 | Guimond et al. |
| 2014/0224727 A1 | 8/2014 | Yu et al. |
| 2014/0331626 A1 | 11/2014 | Nagy et al. |
| 2015/0157969 A1* | 6/2015 | Sealey ............... B01D 39/2024 55/482 |
| 2015/0174509 A1 | 6/2015 | Swaminathan |
| 2015/0182885 A1 | 7/2015 | Thomson et al. |
| 2016/0175752 A1 | 6/2016 | Jaganathan et al. |
| 2017/0350049 A1 | 12/2017 | Shirotani et al. |
| 2018/0169551 A1 | 6/2018 | Jaganthan et al. |
| 2018/0264392 A1 | 9/2018 | Niki et al. |
| 2018/0272255 A1 | 9/2018 | Thomson et al. |
| 2018/0361287 A1* | 12/2018 | Zhang .................... B01D 39/18 |
| 2019/0224609 A1 | 7/2019 | Niki et al. |
| 2019/0299035 A1* | 10/2019 | Sebastian .......... B01D 39/1623 |
| 2020/0002495 A1 | 1/2020 | Niki et al. |
| 2020/0038793 A1 | 2/2020 | Jaganathan et al. |
| 2020/0122070 A1 | 4/2020 | Guimond et al. |
| 2020/0231728 A1* | 7/2020 | Le Floch ................ B32B 27/08 |
| 2022/0072462 A1 | 3/2022 | Jaganathan et al. |
| 2023/0056539 A1 | 2/2023 | Guimond et al. |
| 2023/0390688 A1* | 12/2023 | Song .................. B01D 46/0002 |

FOREIGN PATENT DOCUMENTS

| | | |
|---|---|---|
| CN | 101961607 A | 2/2011 |
| DE | 10 2005 055 607 B3 | 3/2007 |
| DE | 20 2005 019 004 U1 | 4/2007 |
| DE | 10 2005 059 214 A1 | 6/2007 |
| DE | 10 2005 059 214 B4 | 10/2007 |
| DE | 10 2006 017 553 B3 | 12/2007 |
| DE | 20 2007 015 994 U1 | 1/2008 |
| EP | 0 109 282 B1 | 9/1988 |
| EP | 0 462 574 A1 | 12/1991 |
| EP | 0 587 682 B1 | 4/1995 |
| EP | 0 391 661 B1 | 9/1995 |
| EP | 1 048 335 A1 | 11/2000 |
| EP | 1 048 335 B1 | 4/2005 |
| EP | 1 721 555 A1 | 11/2006 |
| EP | 1 775 006 A1 | 4/2007 |
| EP | 1 795 248 A2 | 3/2008 |
| EP | 1 483 039 B1 | 4/2008 |
| JP | 2002-001027 A | 1/2002 |
| JP | 2006-289174 A | 10/2006 |
| JP | 2008-095266 A | 4/2008 |
| WO | WO 00/02006 A2 | 1/2000 |
| WO | WO 01/98574 A2 | 12/2001 |
| WO | WO 02/20668 A2 | 3/2002 |
| WO | WO 03/064006 A1 | 8/2003 |
| WO | WO 03/064013 A1 | 8/2003 |
| WO | WO 2004/028662 A2 | 4/2004 |
| WO | WO 2004/069378 A2 | 8/2004 |
| WO | WO 2004/112937 A1 | 12/2004 |
| WO | WO 2005/034659 A2 | 4/2005 |
| WO | WO 2006/030407 A1 | 3/2006 |
| WO | WO 2006/049664 A1 | 5/2006 |
| WO | WO 2006/053295 A1 | 5/2006 |
| WO | WO 2006/071979 A1 | 7/2006 |
| WO | WO 2006/071980 A1 | 7/2006 |
| WO | WO 2006/096180 A1 | 9/2006 |
| WO | WO 2007/024445 A1 | 3/2007 |
| WO | WO 2007/041310 A2 | 4/2007 |
| WO | WO 2007/041311 A2 | 4/2007 |
| WO | WO 2007/068302 A1 | 6/2007 |
| WO | WO 2007/068408 A1 | 6/2007 |
| WO | WO 2007/068444 A1 | 6/2007 |
| WO | WO 2007/076015 A2 | 7/2007 |
| WO | WO 2007/112443 A2 | 10/2007 |
| WO | WO 2008/011450 A1 | 1/2008 |
| WO | WO 2008/016771 A1 | 2/2008 |
| WO | WO 2008/057397 A1 | 5/2008 |
| WO | WO 2008/057431 A2 | 5/2008 |
| WO | WO 2008/066813 A2 | 6/2008 |
| WO | WO 2008/103736 A1 | 8/2008 |
| WO | WO 2008/150548 A2 | 12/2008 |

\* cited by examiner

FILTER MEDIA COMPRISING A PRE-FILTER LAYER

RELATED APPLICATIONS

This application is a continuation of U.S. application Ser. No. 17/475,458, filed Sep. 15, 2021, which is a continuation of U.S. application Ser. No. 16/504,835 (now U.S. Pat. No. 11,167,232), filed Jul. 8, 2019, which is a continuation of U.S. application Ser. No. 14/577,247 (now U.S. Pat. No. 10,343,095), filed Dec. 19, 2014, each of which is incorporated herein by reference in its entirety.

FIELD OF INVENTION

The present embodiments relate generally to filter media comprising a pre-filter layer, and specifically, to filter media having enhanced performance characteristics.

BACKGROUND

Various filter media can be used to remove contamination in a number of applications. Filter media may be designed to have different performance characteristics, depending on their desired use. For example, relatively lower efficiency filter media may be used for heating, ventilating, refrigerating, air conditioning applications. For applications that demand different performance characteristics (e.g., very high efficiency), such as for clean rooms or biomedical applications, high efficiency particulate air (HEPA) or ultra-low penetration air (ULPA) filters may be used.

Filter media can be formed of one or more fiber webs. A fiber web provides a porous structure that permits fluid (e.g., gas, air) to flow through the filter media. Contaminant particles contained within the fluid may be trapped on or within the fibrous web. Filter media characteristics, such as surface area and basis weight, affect filter performance including filter efficiency, pressure drop, and resistance to fluid flow through the filter media. In general, higher filter efficiencies may result in a higher resistance to fluid flow which leads to higher pressure drops for a given flow rate across the filter media.

There is a need for filter media that can be used in a variety of applications which have a desirable balance of properties including a high efficiency and a low resistance to fluid flow across the filter media, leading to high gamma values.

SUMMARY OF THE INVENTION

Filter media comprising a pre-filter layer, and related components, systems, and methods associated therewith are provided. The subject matter of this application involves, in some cases, interrelated products, alternative solutions to a particular problem, and/or a plurality of different uses of structures and compositions.

In one set of embodiments, a series of filter media are provided. In one embodiment, a filter media comprises a pre-filter layer comprising first fibers having a median diameter of less than or equal to about 2 microns. The pre-filter layer has a thickness of greater than or equal to about 20 microns, a basis weight of less than about 30 g/m², and an initial DOP efficiency of less than or equal to about 90%. The filter media further comprises a second layer comprising second fibers having a median diameter of less than or equal to about 1 micron, wherein the second layer has an initial DOP efficiency of greater than or equal to about 60% and the initial DOP efficiency of the second layer is greater than the pre-filter layer.

In another embodiment, a filter media comprises a pre-filter layer comprising first fibers having a median diameter of less than or equal to about 2 microns. The pre-filter layer has a thickness greater than or equal to about 20 microns, a basis weight of less than about 30 g/m², and an initial DOP efficiency of less than or equal to about 90%. The filter media further comprises a polymeric membrane having an initial DOP efficiency of greater than or equal to about 60% and wherein the initial DOP efficiency of the polymeric membrane is greater than the pre-filter layer.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
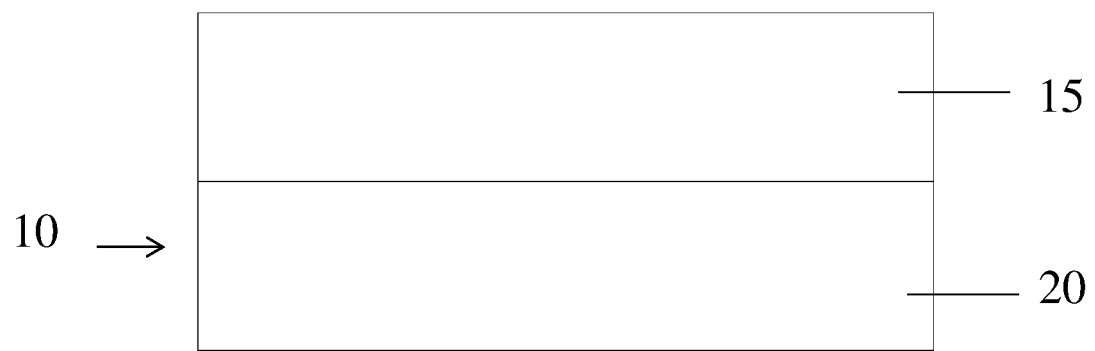
FIGS. 1A-D show cross-sections of filter media according to certain embodiments.

Filter media comprising a pre-filter layer and related components, systems, and methods associated therewith are provided. In some embodiments, the pre-filter layer may be designed to impart desirable properties to the filter media, such as a high dust holding capacity and/or long service life, while having relatively minimal or no adverse effects on another property of the filter media that is important for a given application. For instance, a pre-filter layer may be used to improve the upstream removal of particulate matter, which may clog a downstream layer (e.g., efficiency layer) and reduce filtration performance, without substantially reducing particulate efficiency (e.g., DOP efficiency) or increasing the pressure drop of the filter media. Filter media, as described herein, may be particularly well-suited for applications that involve filtering air, though the media may also be used in other applications.

In some embodiments, the filter media may include a pre-filter layer that comprises fibers having a median diameter of less than or equal to about 2 microns and a second layer comprising fibers having a median diameter of less than or equal to about 1 micron (e.g., less than or equal to 0.5 microns). The particulate efficiency of the second layer may be greater than the particulate efficiency of the pre-filter layer. In some embodiments, the second layer may have a relatively high particulate efficiency (e.g., greater than or equal to 60%, greater than or equal to 75%, greater than or equal to 90%). In some instances, the high particulate efficiency of the second layer may be due, at least in part, to the relatively small median fiber diameter. As used herein, the term "median" has its ordinary meaning and may refers to a value in an ordered set of values below and above which there is an equal number of values or which is the arithmetic mean of the two middle values if there is no one middle number. Median fiber diameters may be determined by any suitable means (e.g., examination by SEM or through the use image processing software).

Many filtration applications require the filter media to meet certain efficiency standards. For example, high efficiency particulate air (HEPA) or ultra-low penetration air (ULPA) filters are required to remove particulates at an efficiency level of greater than 99.95% and 99.9995, respectively, per EN1822. In some existing filter media, the requisite efficiency is achieved at the expense of other beneficial properties of the filter media. For instance, changes to the physical structure of a layer to increase its particulate efficiency may adversely affect the pressure drop, ability to hold particulate matter internally, and/or propensity toward clogging of the layer. For example, many existing filter media use efficiency layers comprising relatively small diameter fibers, which impart high particulate efficiency, but result in a fine pore structure that may clog easily and/or may not hold dust particles internally. In such filter media, a tradeoff may exist between high particulate efficiency and low pressure drop and/or long service life.

Some existing filter media have tried to address this problem by using one or more pre-filter layer(s) upstream of the efficiency layer. However, conventional pre-filter layers may not be able to capture certain particles and/or cannot be added without adversely affecting one or more beneficial filtration property. Moreover, regardless of whether the pre-filter layer removes certain particles, the addition of a layer to the filter media may adversely affect one or more property of the filter media. For instances, the thickness and/or solidity of the pre-filter layer combined with other features of the filter media (e.g., fine pore structure of the efficiency layer) may cause the pressure drop of the filter media to increase significantly. Accordingly, there is a need for filter media that can achieve the requisite particulate efficiency for a given application while mitigating any negative impact on other desirable filtration properties.

In some embodiments, a pre-filter is combined with a second layer to produce a filter media having a requisite particulate efficiency with relatively minimal or no adverse effects on other properties of the filter media. A filter media comprising such a pre-filter layer, as described herein, does not suffer from one or more limitations of existing filter media and/or conventional pre-filter layers. As described further below, pre-filter layers having specific structural features (e.g., low basis weight, median fiber diameter of less than 2 microns) have sufficient particulate efficiency and dust holding capacity to capture and retain small particles that would otherwise clog one or more downstream layers (e.g., efficiency layer), resulting in a significant increase of pressure drop over time and ultimately reduced service life. The pre-filter layer may also have a sufficiently low basis weight such that the addition of the pre-filter layer to the filter media does not significantly increase the overall pressure drop or decrease the gamma of the filter. Moreover, unlike some conventional pre-filter layers, the pre-filter layer, described herein, may contribute to the overall particulate efficiency of the filter media, and, accordingly, may be combined with a second layer having a particulate efficiency less than the standard but greater than the pre-filter layer to produce a filter media having the requisite efficiency. Filter media comprising a pre-filter layer, as described herein, may be used to meet certain particulate efficiency standards (e.g., ULPA, HEPA, facemask) while also having a desirable gamma, pressure drop, change in pressure drop over time, dust holding capacity, and/or service life, amongst other beneficial properties.

In some embodiments, the pre-filter layer has a relatively small median fiber diameter (e.g., less than or equal to about 2 microns), low basis weight (e.g., less than or equal to about 30 g/m$^2$), and/or a particulate efficiency of less than or equal to about 90% (e.g., between about 10% and about 90%). The pre-filter layer may be combined with a second layer (e.g., efficiency layer) having a greater particulate efficiency (e.g., DOP efficiency of greater than or equal to 60%) than the pre-filter layer to form a filter media having desired properties, e.g., a certain particulate efficiency. In addition to one or more of the above structural features, the pre-filter layer may also be relatively thin (e.g., greater than or equal to about 20 microns and less than or equal to about 1 mm), have a high surface area (e.g., greater than or equal to 1.75 m$^2$/g), and/or a low solidity (e.g., greater than or equal to about 0.01% and less than or equal to about 25%). This combination of structural features may produce a pre-filter layer and resulting filter media having improved and unexpected filtration performance.

Figure 1B:
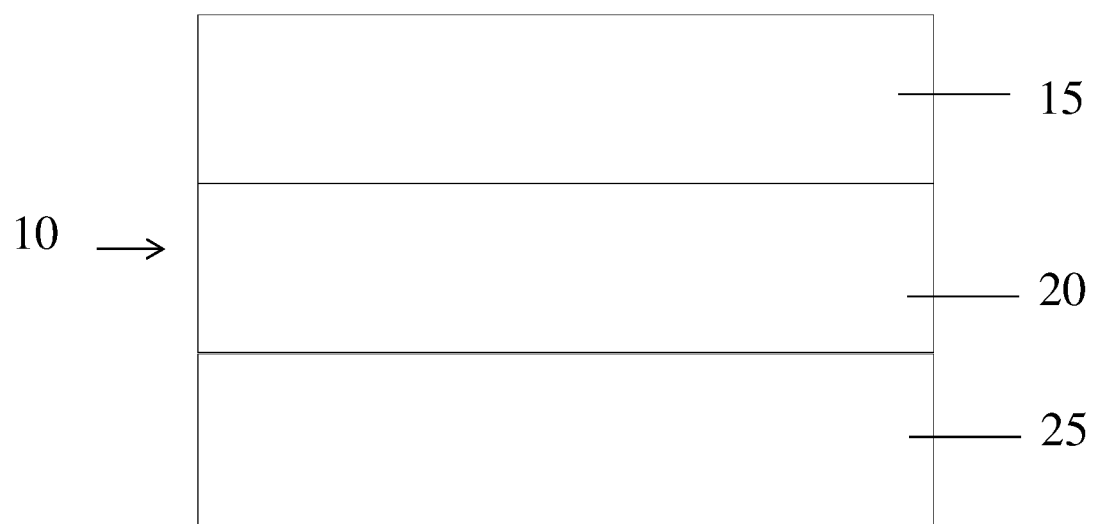
Figure 1C:
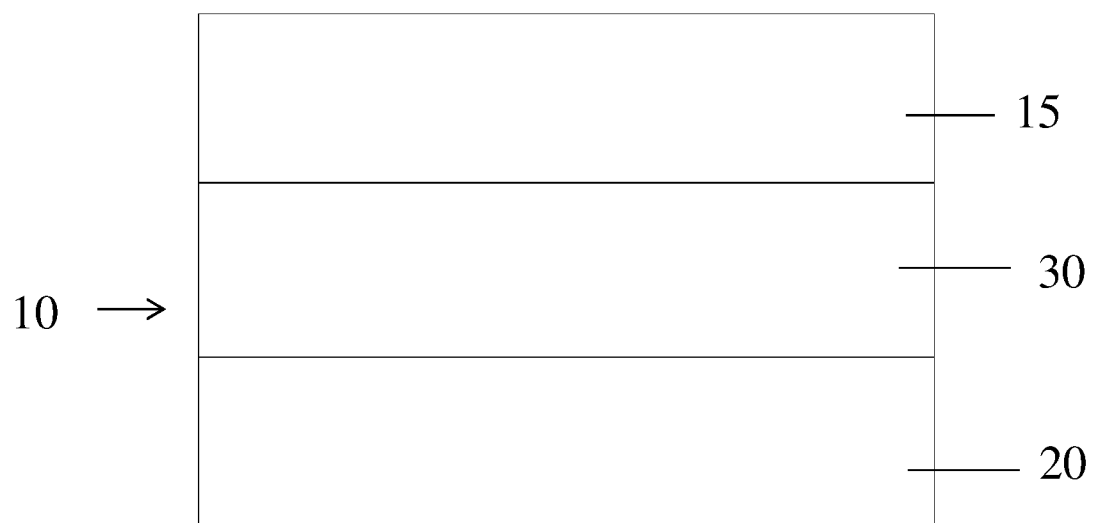
Figure 1D:
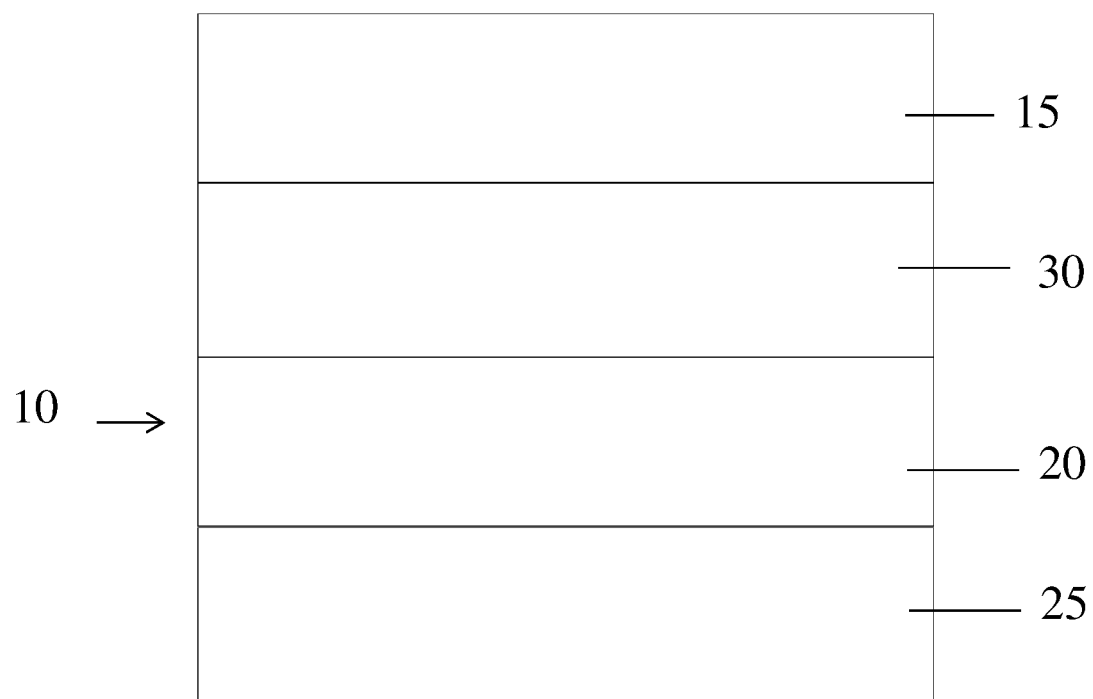

Non-limiting examples of filter media comprising a pre-filter layer are shown in FIGS. 1A-D. In some embodiments, a filter media 10 may include a pre-filter layer 15 and a second layer 20. In some embodiments, the pre-filter layer 15 and the second layer 20 may be directly adjacent as shown in FIGS. 1A-B. In other embodiments, layers 15 and 20 may be indirectly adjacent to one another, and one or more intervening layers (e.g., scrim) may separate the layers as illustrated in FIGS. 1C-D. In some embodiments, filter media 10 may comprise one or more optional layers (e.g., scrim, backer layer) positioned upstream and/or downstream of layers 15 and 20 as illustrated in FIGS. 1B-D. For instance, as illustrated in FIG. 1B, in some embodiments, the filter media may comprise a third layer 25 downstream of the pre-filter layer and the second layer. In some instances, the third layer may be directly adjacent to the second layer. In certain embodiments, layer 25 may be a scrim layer that is directly adjacent to the second layer. In other embodiments, layer 25 may be a backer layer (e.g., pleatable backer layer), as described in more detail below, that is directly adjacent to the pre-filter layer. In some instances, the backer layer (e.g., pleatable backer layer) may have a relatively high air permeability (e.g., greater than or equal to about 100 CFM) and machine direction stiffness (e.g., greater than or equal to about 600 gu). In other embodiments, layers 20 and 25 may be indirectly adjacent to one another, and one or more intervening layers may separate the layers.

Regardless of whether the filter media comprises layer 25, the filter media 10 may comprise a layer 30 upstream of the second layer as shown in FIG. 1C. In some instances, the layer 30 may be directly adjacent to the pre-filter layer. In certain embodiments, layer 30 may be a backer layer (e.g., pleatable backer layer) that is directly adjacent to the pre-filter layer. In other embodiments, layers 15 and 30 may be indirectly adjacent to one another, and one or more intervening layers may separate the layers.

In some embodiments, filter media 10 may include a pre-filter layer 15, a second layer 20, a third layer 25, and a fourth layer 30, as shown illustratively in FIG. 1D. In other embodiments, filter media 10 may include a pre-filter layer 15, a second layer 20, and either a third layer 25 or a fourth layer 30 as shown in FIGS. 1B and 1C, respectively.

In general, the one or more optional layers may be any suitable layer (e.g., a scrim layer, a backer layer, a substrate layer, an efficiency layer, a capacity layer, a spacer layer, a support layer).

As used herein, when a layer is referred to as being "adjacent" another layer, it can be directly adjacent the layer, or an intervening layer also may be present. A layer that is "directly adjacent" another layer means that no intervening layer is present.

In some embodiments, one or more layer in the filter media may be designed to be discrete from another layer. That is, the fibers from one layer do not substantially intermingle (e.g., do not intermingle at all) with fibers from another layer. For example, with respect to FIG. 1, in one set of embodiments, fibers from the pre-filter layer do not substantially intermingle with fibers of the second layer. Discrete layers may be joined by any suitable process including, for example, lamination, thermo-dot bonding, calendering, ultrasonic processes, or by adhesives, as described in more detail below. It should be appreciated, however, that certain embodiments may include one or more layers that are not discrete with respect to one another.

It should be understood that the configurations of the layers shown in the figures are by way of example only, and that in other embodiments, filter media including other configurations of layers may be possible. For example, while the first, second, optional third, and optional fourth layers are shown in a specific order in FIG. 1, other configurations are also possible. For example, the optional third layer may be positioned between the first and second layers. It should be appreciated that the terms "second", "third" and "fourth" layers, as used herein, refer to different layers within the media, and are not meant to be limiting with respect to the location of that layer. Furthermore, in some embodiments, additional layers (e.g., "fifth", "sixth", or "seventh" layers) may be present in addition to the ones shown in the figures. It should also be appreciated that not all components shown in the figures need be present in some embodiments.

The structural features of pre-filter layer 15 may be balanced to produce a pre-filter layer that imparts beneficial properties to the filter media while having relatively minimal or no adverse effects on another property of the filter media that are important for a given application. For instance, in some embodiments, the pre-filter layer may have a relatively small median fiber diameter that imparts sufficient dust holding capacity, surface area, and/or gamma at a relatively low basis weight and/or solidity. In some embodiments, the pre-filter layer may have a median fiber diameter greater than or equal to about 0.1 microns, greater than or equal to about 0.2 microns, greater than or equal to about 0.3 microns, greater than or equal to about 0.4 microns, greater than or equal to about 0.5 microns, greater than or equal to about 0.8 microns, greater than or equal to about 1 micron, greater than or equal to about 1.2 microns, greater than or equal to about 1.5 microns, or greater than or equal to about 1.8 microns. In some instances, the median fiber diameter may be less than or equal to about 2 microns, less than or equal to about 1.8 microns, less than or equal to about 1.5 microns, less than or equal to about 1.2 microns, less than or equal to about 1 micron, less than or equal to about 0.8 microns, less than or equal to about 0.5 microns, less than or equal to about 0.4 microns, less than or equal to about 0.3 microns, or less than or equal to about 0.2 microns. Combinations of the above-referenced ranges are also possible (e.g., greater than or equal to about 0.5 microns and less than or equal to about 1 micron). Other values of median fiber diameter are also possible. In some embodiments, the average diameter of the fibers may fall within the above-referenced ranges for median fiber diameter.

In certain embodiments, a suitable range for median fiber diameter (e.g., greater than or equal to about 0.5 microns and less than or equal to about 1 micron) may exist that allows the pre-filter layer to impart beneficial properties while minimizing negative side effects. For instances, in some embodiments, median fiber diameters above the suitable range may produce the desired dust holding capacity but may only be able to achieve the requisite particulate efficiency by increasing the basis weight of the pre-filter layer, which can increase the pressure drop. Conversely, in some embodiments, a median fiber diameter below the suitable range may produce the requisite particulate efficiency and gamma, but may lack sufficient dust holding capacity and/or be prone to clogging, which can reduce the service life of the filter media. In some embodiments, the suitable range may be greater than or equal to about 0.1 microns and less than or equal to about 2 microns, greater than or equal to about 0.1 microns and less than or equal to about 1 micron, or greater than or equal to about 0.5 microns and less than or equal to about 1 micron. It should be understood that, in some instances, the suitable median fiber diameter range may vary based on the filtration application.

In some embodiments, the pre-filter layer may have a relatively small basis weight. For instance, in some embodiments, the filter media may have a basis weight of less than or equal to about 30 g/m$^2$, less than or equal to about 25 g/m$^2$, less than or equal to about 20 g/m$^2$, less than or equal to about 15 g/m$^2$, less than or equal to about 10/m$^2$, less than or equal to about 5 g/m$^2$, less than or equal to about 1 g/m$^2$, less than or equal to about 0.8 g/m$^2$, or less than or equal to about 0.5 g/m$^2$. In some instances, the pre-filter layer may have a basis weight of greater than or equal to about 0.2 g/m$^2$, greater than or equal to about 0.5 g/m$^2$, greater than or equal to about 0.8 g/m$^2$, greater than or equal to about 1 g/m$^2$, greater than or equal to about 5 g/m$^2$, greater than or equal to about 10 g/m$^2$, greater than or equal to about 15 g/m$^2$, greater than or equal to about 20 g/m$^2$, or greater than or equal to about 25 g/m$^2$. Combinations of the above-referenced ranges are also possible (e.g., greater than or equal to about 0.5 g/m$^2$ and less than or equal to about 30 g/m$^2$). Other values of basis weight are also possible. The basis weight may be determined according to the standard ISO 536.

As described in more detail below, the pre-filter layer may comprise synthetic fibers, glass fibers, and/or cellulose fibers, amongst other fiber types. In some instances, the pre-filter layer may comprise a relatively high weight percentage of synthetic fibers (e.g., 100 weight percent). For example, the pre-filter may comprise synthetic fibers formed from a meltblown process, melt spinning process, centrifugal spinning process, or electrospinning process. In some instances, the synthetic fibers may be continuous as described further below. In some embodiments, the pre-filter layer may comprise relatively little or no glass fibers. In other embodiments, the pre-filter layer may comprise a relatively high weight percentage of glass fibers (e.g., 100 weight percent).

In some embodiments, the pre-filter layer may be relatively thin. For instance, in some embodiments, the pre-filter layer may have a thickness of less than or equal to about 5 mm, less than or equal to about 4.5 mm, less than or equal to about 4 mm, less than or equal to about 3.5 mm, less than or equal to about 3 mm, less than or equal to about 2.5 mm, less than or equal to about 2 mm, less than or equal to about 1.5 mm, less than or equal to about 1 mm, less than or equal to about 0.5 mm, or less than or equal to about 0.1 mm. In some instances, the pre-filter layer may have a thickness of greater than or equal to about 0.02 mm, greater than or equal to about 0.05 mm, greater than or equal to about 0.08 mm, greater than or equal to about 0.1 mm, greater than or equal to about 0.5 mm, greater than or equal to about 1 mm, greater than or equal to about 1.5 mm, greater than or equal to about 2 mm, greater than or equal to about 2.5 mm, greater than or equal to about 3 mm, greater than or equal to about 3.5 mm, or greater than or equal to about 4 mm. Combinations of the above-referenced ranges are also possible (e.g., greater than or equal to about 0.05 mm and less than or equal to about 5 mm, greater than or equal to about 0.1 mm and less than or equal to about 1 mm). Other values of average thickness are also possible. The thickness is determined according to the standard ISO 534 at 2.65 lb/in$^2$. In certain embodiments, a minimum thickness (e.g., greater than or equal to about 0.02 mm) may be required to achieve certain beneficial filtration properties (e.g., dust holding capacity).

In certain embodiments, the pre-filter layer, described herein, may have a relatively high surface area. For instance, in some embodiments, the pre-filter layer may have a surface area of greater than or equal to about 1.75 m$^2$/g, greater than or equal to about 2.0 m$^2$/g, greater than or equal to about 2.5 m$^2$/g, greater than or equal to about 3 m$^2$/g, greater than or equal to about 3.5 m$^2$/g, greater than or equal to about 4 m$^2$/g, greater than or equal to about 4.5 m$^2$/g, greater than or equal to about 5 m$^2$/g, greater than or equal to about 10 m$^2$/g, greater than or equal to about 15 m$^2$/g, greater than or equal to about 20 m$^2$/g, greater than or equal to about 25 m$^2$/g, greater than or equal to about 30 m$^2$/g, greater than or equal to about 35 m$^2$/g, or greater than or equal to 40 m$^2$/g. In some instances, the pre-filter layer may have a surface area of less than or equal to about 45 m$^2$/g, less than or equal to about 40 m$^2$/g, less than or equal to about 35 m$^2$/g, less than or equal to about 30 m$^2$/g, less than or equal to about 25 m$^2$/g, less than or equal to about 20 m$^2$/g, less than or equal to about 15 m$^2$/g, less than or equal to about 10 m$^2$/g, less than or equal to about 5 m$^2$/g, less than or equal to about 4.5 m$^2$/g, less than or equal to about 4 m$^2$/g, less than or equal to about 3.5 m$^2$/g, or less than or equal to about 3 m$^2$/g. It should be understood that combinations of the above-reference ranges are possible (e.g., greater than or equal to about 1.75 m$^2$/g and less than or equal to about 5.0 m$^2$/g, greater than or equal to about 5 m$^2$/g and less than or equal to about 45 m$^2$/g).

As determined herein, surface area is measured through use of a standard BET surface area measurement technique. The BET surface area is measured according to section 10 of Battery Council International Standard BCIS-03A, "Recommended Battery Materials Specifications Valve Regulated Recombinant Batteries", section 10 being "Standard Test Method for Surface Area of Recombinant Battery Separator Mat". Following this technique, the BET surface area is measured via adsorption analysis using a BET surface analyzer (e.g., Micromeritics Gemini III 2375 Surface Area Analyzer) with nitrogen gas; the sample amount is between 0.5 and 0.6 grams in, e.g., a ¾" tube; and, the sample is allowed to degas at 75 degrees C. for a minimum of 3 hours.

In certain embodiments, the pre-filter layer, described herein, may have a relatively low solidity. For instance, in some embodiments, the pre-filter layer may have a solidity of less than or equal to about 50%, less than or equal to about 40%, less than or equal to about 30%, less than or equal to about 10%, less than or equal to about 5%, less than or equal to about 1%, less than or equal to about 0.5%, less than or equal to about 0.1%, or less than or equal to about 0.05%. In some instances, the pre-filter layer may have a solidity of greater than or equal to about 0.001%, greater than or equal to about 0.005%, greater than or equal to about 0.01%, greater than or equal to about 0.05%, greater than or equal to about 0.1%, greater than or equal to about 0.5%, greater than or equal to about 1%, greater than or equal to about 5%, greater than or equal to about 10%, greater than or equal to about 15%, greater than or equal to about 20%, greater than or equal to about 25%, greater than or equal to about 30%, or greater than or equal to about 40%. It should be understood that combinations of the above-reference ranges are possible (e.g., greater than or equal to about 0.001% and less than or equal to about 50%, greater than or equal to about 0.01% and less than or equal to about 25%). Solidity may be determined by using the following formula: solidity=[basis weight/(fiber density*thickness)]*100. The basis weight and thickness may be determined as described herein. The porosity can be derived from the solidity based on the following equation solidity (%)=100−porosity (%).

In some embodiments, the pre-filter layer may have a certain particulate efficiency. Particulate efficiency may be determined by measuring the penetration of certain particles through a layer and/or a filter media. Penetration, often expressed as a percentage, is defined as follows:

$$\text{Pen} = (C/C_0) * 100$$

where C is the particle concentration after passage through the filter and $C_0$ is the particle concentration before passage through the filter. Typical tests of penetration involve blowing dioctyl phthalate (DOP) or sodium chloride (NaCl) particles through a filter media or layer and measuring the percentage of particles that penetrate through the filter media or layer. Penetration and pressure drop values described herein were determined using an 8130 CertiTest™ automated filter testing unit from TSI, Inc. equipped with a DiOctyl Phthalate generator for DOP aerosol testing or a sodium chloride generator for NaCl aerosol testing based on the EN1822:2009 standard for DOP particles and ASTM D2 986-91 standard for NaCl particles. The average particle size created by DOP particle generator was approximately 0.3 micron mass mean diameter. The average particle size created by the salt particle generator was 0.26 micron mass mean diameter. The instrument measured a pressure drop across the fiber web and the resultant penetration value on an instantaneous basis. The initial penetration is the first taken at the beginning of the test and can be used to determine the initial efficiency. All penetration values described herein were determined using a continuous loading of either the DOP or NaCl particles and subjecting the upstream face of a layer to an airflow of 32 L/min over a 100 cm$^2$ face area of the fiber web, giving a media face velocity of 5.3 cm/s. The media face velocity is the velocity of air as it hits the upstream side of the filter media.

Particulate efficiency is defined as:
100-% Penetration

Because it may be desirable to rate filter media or layer based on the relationship between penetration and pressure drop across the media, or particulate efficiency as a function of pressure drop across the media or web, filters may be rated according to a value termed gamma value. Generally, higher gamma values are indicative of better filter performance, i.e., a high particulate efficiency as a function of pressure drop. Gamma value is expressed according to the following formula:

$$\mathrm{gamma} = (-\log(\text{initial DOP penetration \%}/100)/\text{pressure drop,Pa}) \times 100 \times 9.8,$$

which is equivalent to:

$$\mathrm{gamma} = (-\log(\text{initial DOP penetration \%}/100)/\text{pressure drop, mm H}_2\text{O}) \times 100$$

As discussed above, the DOP penetration percentage is based on the percentage of particles that penetrate through the filter media or layer. With decreased DOP penetration percentage (i.e., increased particulate efficiency) where particles are less able to penetrate through the filter media or layer, gamma increases. With decreased pressure drop (i.e., low resistance to fluid flow across the filter), gamma increases. These generalized relationships between DOP penetration, pressure drop, and/or gamma assume that the other properties remain constant.

The particulate efficiency of the pre-filter layer may be less than the second layer and may vary based on the application. For instance, in some embodiments, the pre-filter layer may have an initial DOP efficiency of greater than or equal to about 5%, greater than or equal to about 10%, greater than or equal to about 20%, greater than or equal to about 30%, greater than or equal to about 40%, greater than or equal to about 50%, greater than or equal to about 60%, greater than or equal to about 65%, greater than or equal to about 70%, greater than or equal to about 75%, greater than or equal to about 80%, greater than or equal to about 85%, or greater than or equal to about 90%. In some instances, the pre-filter layer may have an initial DOP efficiency of less than or equal to about 90%, less than or equal to about 85%, less than or equal to about 80%, less than or equal to about 75%, less than or equal to about 70%, less than or equal to about 65%, less than or equal to about 60%, less than or equal to about 50%, less than or equal to about 40%, less than or equal to about 30%, less than or equal to about 20%, or less than or equal to about 10%. It should be understood that combinations of the above-referenced ranges are possible. The initial DOP efficiency may be measured according to EN1822. In some embodiments, the pre-filter layer may have an initial DOP efficiency of greater than or equal to about 10% and less than or equal to about 90% or greater than or equal to about 15% and less than or equal to about 85% for certain applications (e.g., high efficiency, ultra high efficiency, HEPA, ULPA). In other applications (e.g., low efficiency, HVAC), the pre-filter layer may have an initial DOP efficiency of greater than or equal to about 5% and less than or equal to about 85% or greater than or equal to about 10% and less than or equal to about 60%.

In some embodiments, the initial NaCl particle efficiency of the pre-filter layer may range as described above with respect to the initial DOP efficiency of the pre-filter layer. For instance, in some embodiments, the pre-filter layer may have an initial NaCl particle efficiency of greater than or equal to about 5%, greater than or equal to about 10%, greater than or equal to about 20%, greater than or equal to about 30%, greater than or equal to about 40%, greater than or equal to about 50%, greater than or equal to about 60%, greater than or equal to about 65%, greater than or equal to about 70%, greater than or equal to about 75%, greater than or equal to about 80%, greater than or equal to about 85%, or greater than or equal to about 90%. In some instances, the pre-filter layer may have an initial NaCl particle efficiency of less than or equal to about 90%, less than or equal to about 85%, less than or equal to about 80%, less than or equal to about 75%, less than or equal to about 70%, less than or equal to about 65%, less than or equal to about 60%, less than or equal to about 50%, less than or equal to about 40%, less than or equal to about 30%, less than or equal to about 20%, or less than or equal to about 10%. It should be understood that combinations of the above-referenced ranges are possible. In some embodiments, the pre-filter layer may have an initial NaCl particle efficiency of greater than or equal to about 10% and less than or equal to about 90% or greater than or equal to about 15% and less than or equal to about 85% for certain applications (e.g., high efficiency, ultra high efficiency, HEPA, ULPA). In other applications (e.g., low efficiency, HVAC), the pre-filter layer may have an initial NaCl particle efficiency of greater than or equal to about 5% and less than or equal to about 85% or greater than or equal to about 10% and less than or equal to about 60%. The initial NaCl particle efficiency may be determined using ASTM D2 986-91.

In general, the pre-filter layer may be designed to produce a filter media having a relatively high gamma. In some instances, the pre-filter layer may have a gamma of greater than or equal to about 3, greater than or equal to about 5, greater than or equal to about 8, greater than or equal to about 10, greater than or equal to about 12, greater than or equal to about 15, greater than or equal to about 20, greater than or equal to about 30, greater than or equal to about 40, greater than or equal to about 50, or greater than or equal to about 60. In some instances, the pre-filter layer may have a gamma of less than or equal to about 75, less than or equal to about 60, less than or equal to about 50, less than or equal to about 40, less than or equal to about 30, less than or equal to about 25, less than or equal to about 20, less than or equal to about 15, or less than or equal to about 10. It should be understood that combinations of the above-reference ranges are possible (e.g., greater than or equal to about 3 and less than or equal to about 75, greater than or equal to about 8 and less than or equal to about 75, greater than or equal to about 20 and less than or equal to about 75).

It should be understood that the gamma, DOP efficiency, and NaCl efficiency values, described herein, may be obtained using an uncharged layer, such that particle separation is substantially or solely mechanical. For example, the layer or filter media may be discharged or otherwise treated, such that only mechanical particle separation occurs. In other embodiments, the layer or filter media may be charged and particle separation may not be substantially or solely due mechanical particle separation.

In some embodiments, the pre-filter layer may have a relatively low pressure drop. For instance, in some embodiments, the pressure drop may be less than or equal to about 35 mm $H_2O$, less than or equal to about 30 mm $H_2O$, less than or equal to about 25 mm $H_2O$, less than or equal to about 20 mm $H_2O$, less than or equal to about 15 mm $H_2O$, less than or equal to about 10 mm $H_2O$, less than or equal to about 5 mm $H_2O$, less than or equal to about 1 mm $H_2O$, or less than or equal to about 0.5 mm $H_2O$. In some instances, the pressure drop may be greater than or equal to about 0.1 mm $H_2O$, greater than or equal to about 0.3 mm $H_2O$, greater than or equal to about 0.6 mm $H_2O$, greater than or equal to about 1 mm $H_2O$, greater than or equal to about 5 mm $H_2O$, greater than or equal to about 10 mm $H_2O$, greater than or equal to about 15 mm $H_2O$, greater than or equal to about 20 mm $H_2O$, or greater than or equal to about 25 mm $H_2O$. It should be understood that all combinations of the above-referenced ranges are possible (e.g., greater than or equal to about 0.1 mm $H_2O$ and less than or equal to about 35 mm H$_2$O, greater than or equal to about 0.6 mm H$_2$O and less than or equal to about 15 mm H$_2$O). Other ranges and values of pressure drop are also possible. As used herein, pressure drop may be measured as described above.

In some embodiments, the air permeability of the pre-filter layer may be less than or equal to about 1,400 ft$^3$/min/ft$^2$ (CFM), less than or equal to about 1,200 CFM, less than or equal to about 1,000 CFM, less than or equal to about 750 CFM, less than or equal to about 500 CFM, less than or equal to about 300 CFM, less than or equal to about 100 CFM, less than or equal to about 75 CFM, less than or equal to about 50 CFM, less than or equal to about 25 CFM, or less than or equal to about 10 CFM. In some instances, the air permeability of the pre-filter layer may be greater than or equal to about 2 CFM, greater than or equal to about 5 CFM, greater than or equal to about 8 CFM, greater than or equal to about 10 CFM, greater than or equal to about 25 CFM, greater than or equal to about 50 CFM, greater than or equal to about 100 CFM, greater than or equal to 250 CFM, greater than or equal to about 500 CFM, greater than or equal to about 750 CFM, greater than or equal to about 1,000 CFM, or greater than or equal to about 1,250 CFM. It should be understood that all combinations of the above-referenced ranges are possible (e.g., greater than or equal to about 2 CFM and less than or equal to about 1,400 CFM, greater than or equal to about 8 CFM and less than or equal to about 300 CFM). Other ranges are also possible.

As used herein, air permeability is measured according to the standard ASTM D737-75. In the air permeability testing apparatus, the sample is clamped on to a test head which provides a circular test area of 38.3 cm$^2$ referred to as nozzle, at a force of at least 50+/−5 N without distorting the sample and with minimum edge leakage. A steady flow of air perpendicular to the sample test area is then supplied providing a pressure differential of 12.5 mm H$_2$O across the material being tested. This pressure differential is recorded from the pressure gauge or manometer connected to the test head. The air permeability through the test area is measured in ft$^3$/min/ft$^2$ using a flow meter or volumetric counter. A Frazier air permeability tester is an example apparatus for such a measurement.

In some embodiments, the mean flow pore size of the pre-filter layer may be greater than or equal to about 0.5 microns, greater than or equal to about 1 micron, greater than or equal to about 5 microns, greater than or equal to about 10 microns, greater than or equal to about 20 microns, greater than or equal to about 30 microns, or greater than or equal to about 40 microns. In some instances, the pre-filter layer may have a mean flow pore size of less than or equal to about 50 microns, less than or equal to about 40 microns, less than or equal to about 30 microns, less than or equal to about 20 microns, less than or equal to about 10 microns, less than or equal to about 5 microns, less than or equal to about 2 microns, or less than or equal to about 1 micron. Combinations of the above-referenced ranges are also possible (e.g., greater than or equal to about 0.5 microns and less than or equal to about 50 microns, greater than or equal to about 1 micron and less than or equal to about 30 microns). Other values of mean flow pore size are also possible. The mean flow pore size may be determined according to the standard ASTM F316-03.

In some embodiments, the pre-filter layer may be pleatable. In some such embodiments, the pre-filter layer may have one or more of the mechanical properties (e.g., Mullen burst, elongation, tensile strength, stiffness) described below with respect to the backer layer (e.g., pleatable backer layer).

In some embodiments, filter media 10 may comprise a second layer 20. The second layer may be designed to enhance the particulate efficiency (e.g., initial DOP efficiency, initial NaCl efficiency) of the filter media. In some such embodiments, the second layer may be a single layer or include a plurality of sub-layers. For instance, the second layer may comprise between about 2 and about 10, between about 2 and about 8, between about 2 and about 6, or between about 2 and about 4 sub-layers. In certain embodiments, the second layer may include 2 or 3 sub-layers. In some embodiments, one or more sub-layer may be designed to be discrete from another sub-layer. In some instances, all sub-layers in the second layer may be discrete. In other embodiments, one or more sub-layer may not be discrete.

Regardless of whether the second layer is a single layer or comprises a plurality of sub-layers, the second layer 20 (e.g., efficiency layer) may have a relatively small median fiber diameter. In other embodiments, the second layer may not comprise fibers (e.g., when the second layer is a synthetic membrane layer). As described below, the second layer may have a greater particulate efficiency than the pre-filter layer.

In some embodiments, the second layer may have a median fiber diameter of less than or equal to about 1 micron, less than or equal to about 0.8 microns, less than or equal to about 0.5 microns, less than or equal to about 0.2 microns, less than or equal to about 0.1 microns, less than or equal to about 0.08 microns, less than or equal to about 0.05 microns, less than or equal to about 0.04 microns, less than or equal to about 0.03 microns, or less than or equal to about 0.02 microns. In some instances, the median fiber diameter may be greater than or equal to about 0.01 microns, greater than or equal to about 0.03 microns, greater than or equal to about 0.05 microns, greater than or equal to about 0.07 microns, greater than or equal to about 0.1 micron, greater than or equal to about 0.2 microns, greater than or equal to about 0.3 microns, greater than or equal to about 0.4 microns, greater than or equal to about 0.5 microns, greater than or equal to about 0.8 microns, or greater than or equal to about 1 micron. Combinations of the above-referenced ranges are also possible (e.g., greater than or equal to about 0.1 micron and less than or equal to about 1 micron, greater than or equal to about 0.07 micron and less than or equal to about 0.5 micron). Other values of median fiber diameter are also possible. In some embodiments, the average diameter of the fibers may fall within the above-referenced ranges for median fiber diameter.

As described in more detail below, the second layer (e.g., efficiency layer) may comprise synthetic fibers, glass fibers, and/or cellulose fibers, amongst other fiber types. In some instances, the second layer may comprise a relatively high weight percentage of synthetic fibers (e.g., 100 weight percent). In some such embodiments, the second layer may comprise relatively little or no glass fibers. In other embodiments, the second layer may comprise a relatively high weight percentage of glass fibers (e.g., 100 weight percent).

In general, the efficiency of the second layer is greater than the pre-filter layer and may vary based on the application. For instance, in some embodiments, the second layer may have an DOP efficiency of greater than or equal to about 10%, greater than or equal to about 20%, greater than or equal to about 35%, greater than or equal to about 50%, greater than or equal to about 60%, greater than or equal to about 70%, greater than or equal to about 80%, greater than or equal to about 90%, greater than or equal to about 95%, greater than or equal to about 97%, greater than or equal to about 99%, greater than or equal to about 99.5%, greater than or equal to about 99.9%, greater than or equal to about 99.95%, greater than or equal to about 99.99%, or greater than or equal to about 99.995%. In some instances, the second layer may have an initial DOP efficiency of less than or equal to about 99.99999%, less than or equal to about 99.999%, less than or equal to about 99.99%, less than or equal to about 99.997%, less than or equal to about 99.995%, less than or equal to about 99.9%, less than or equal to about 99.5%, less than or equal to about 99%, less than or equal to about 98%, less than or equal to about 97%, less than or equal to about 95%, less than or equal to about 90%, less than or equal to about 85%, less than or equal to about 75%, less than or equal to about 60%, less than or equal to about 50%, less than or equal to about 40%, less than or equal to about 30%, less than or equal to about 20%, or less than or equal to about 10%. It should be understood that combinations of the above-referenced ranges are possible (e.g., greater than or equal to about 60% and less than or equal to about 99.99999%). The initial DOP efficiency may be measured according to EN1822 as described above.

In some embodiments, the second layer may have an initial DOP efficiency of greater than or equal to about 70% and less than or equal to about 99.99% or greater than or equal to about 80% and less than or equal to about 99.99999% for certain applications. In some applications, the second layer may have an initial DOP efficiency of greater than or equal to about 80% and less than or equal to about 99.99999% or greater than or equal to about 90% and less than or equal to about 99.9999%. In certain applications (e.g., low particulate efficiency, HVAC), the second layer may have an initial DOP efficiency of greater than or equal to about 10% and less than or equal to about 90% or greater than or equal to about 35% and less than or equal to about 90%.

In some embodiments, the NaCl particle efficiency of the second layer may range as described above with respect to the DOP efficiency of the second layer. Other ranges and values of DOP and NaCl particle filtration particulate efficiency are also possible. For instance, in some embodiments, the second layer may have an initial NaCl efficiency of greater than or equal to about 10%, greater than or equal to about 20%, greater than or equal to about 35%, greater than or equal to about 50%, greater than or equal to about 60%, greater than or equal to about 70%, greater than or equal to about 80%, greater than or equal to about 90%, greater than or equal to about 95%, greater than or equal to about 97%, greater than or equal to about 99%, greater than or equal to about 99.5%, greater than or equal to about 99.9%, greater than or equal to about 99.95%, greater than or equal to about 99.99%, or greater than or equal to about 99.995%. In some instances, the second layer may have an initial NaCl efficiency of less than or equal to about 99.99999%, less than or equal to about 99.999%, less than or equal to about 99.99%, less than or equal to about 99.997%, less than or equal to about 99.995%, less than or equal to about 99.9%, less than or equal to about 99.5%, less than or equal to about 99%, less than or equal to about 98%, less than or equal to about 97%, less than or equal to about 95%, less than or equal to about 90%, less than or equal to about 85%, less than or equal to about 75%, less than or equal to about 60%, less than or equal to about 50%, less than or equal to about 40%, less than or equal to about 30%, less than or equal to about 20%, or less than or equal to about 10%. It should be understood that combinations of the above-referenced ranges are possible (e.g., greater than or equal to about 60% and less than or equal to about 99.99999%). The initial NaCl efficiency may be determined as described above.

In general, the second layer may have a relatively high gamma. In some instances, the second layer may have a gamma of greater than or equal to about 7, greater than or equal to about 10, greater than or equal to about 12, greater than or equal to about 15, greater than or equal to about 20, greater than or equal to about 30, greater than or equal to about 40, greater than or equal to about 50, or greater than or equal to about 60. In some instances, the second layer may have a gamma of less than or equal to about 75, less than or equal to about 60, less than or equal to about 50, less than or equal to about 40, less than or equal to about 30, less than or equal to about 25, less than or equal to about 20, less than or equal to about 15, or less than or equal to about 10. It should be understood that combinations of the above-reference ranges are possible (e.g., greater than or equal to about 7 and less than or equal to about 75, greater than or equal to about 10 and less than or equal to about 75, greater than or equal to about 20 and less than or equal to about 75).

In some embodiments, the second layer described herein may have a pressure drop of greater than or equal to about 0.5 mm $H_2O$, greater than or equal to about 1 mm $H_2O$, greater than or equal to about 5 mm $H_2O$, greater than or equal to about 10 mm $H_2O$, greater than or equal to about 25 mm $H_2O$, greater than or equal to about 50 mm $H_2O$, greater than or equal to about 75 mm $H_2O$, greater than or equal to about 100 mm $H_2O$, or greater than or equal to about 125 mm $H_2O$. In some instances, the pressure drop may be less than or equal to about 150 mm $H_2O$, less than or equal to about 125 mm $H_2O$, less than or equal to about 100 mm $H_2O$, less than or equal to about 90 mm $H_2O$, less than or equal to about 75 mm $H_2O$, less than or equal to about 50 mm $H_2O$, less than or equal to about 25 mm $H_2O$, or less than or equal to about 10 mm $H_2O$. It should be understood that combination of the above-referenced ranges are possible (e.g., greater than or equal to about 0.5 mm $H_2O$ and less than or equal to about 150 mm $H_2O$, greater than or equal to about 1 mm $H_2O$ and less than or equal to about 90 mm $H_2O$). Other ranges and values of pressure drop are also possible. Pressure drop may be determined as described above.

In some embodiments, the second layer may have a basis weight of less than or equal to about 75 $g/m^2$, less than or equal to about 50 $g/m^2$, less than or equal to about 35 $g/m^2$, less than or equal to about 25 $g/m^2$, less than or equal to about 20 $g/m^2$, less than or equal to about 15 $g/m^2$, less than or equal to about 10 $g/m^2$, less than or equal to about 5 $g/m^2$, less than or equal to about 1 $g/m^2$, less than or equal to about 0.8 $g/m^2$, less than or equal to about 0.5 $g/m^2$, less than or equal to about 0.1 $g/m^2$, less than or equal to about 0.05 $g/m^2$, or less than or equal to about 0.01 $g/m^2$. In some instances, the second layer may have a basis weight of greater than or equal to about 0.005 $g/m^2$, greater than or equal to about 0.01 $g/m^2$, greater than or equal to about 0.05 $g/m^2$, greater than or equal to about 0.08 $g/m^2$, greater than or equal to about 0.1 $g/m^2$, greater than or equal to about 0.2 $g/m^2$, greater than or equal to about 0.5 $g/m^2$, greater than or equal to about 0.8 $g/m^2$, greater than or equal to about 1 $g/m^2$, greater than or equal to about 5 $g/m^2$, greater than or equal to about 10 $g/m^2$, greater than or equal to about 15 $g/m^2$, greater than or equal to about 20 $g/m^2$, greater than or equal to about 30 $g/m^2$, greater than or equal to about 40 $g/m^2$, greater than or equal to about 50 $g/m^2$, or greater than or equal to about 60 $g/m^2$. Combinations of the above-referenced ranges are also possible (e.g., greater than or equal to about 0.005 $g/m^2$ and less than or equal to about 75 $g/m^2$, greater than or equal to about 0.01 $g/m^2$ and less than or equal to about 50 g/m$^2$). Other values of basis weight are also possible. The basis weight is determined according to the standard ISO 536.

In some embodiments, the second layer may have a thickness of less than or equal to about 5 mm, less than or equal to about 4.5 mm, less than or equal to about 4 mm, less than or equal to about 3.5 mm, less than or equal to about 3 mm, less than or equal to about 2.5 mm, less than or equal to about 2 mm, less than or equal to about 1.5 mm, less than or equal to about 1 mm, less than or equal to about 0.5 mm, less than or equal to about 0.1 mm, less than or equal to about 0.05 mm, or less than or equal to about 0.01 mm. In some instances, the second layer may have a thickness of greater than or equal to about 0.001 mm, greater than or equal to about 0.005 mm, greater than or equal to about 0.01 mm, greater than or equal to about 0.05 mm, greater than or equal to about 0.08 mm, greater than or equal to about 0.1 mm, greater than or equal to about 0.5 mm, greater than or equal to about 1 mm, greater than or equal to about 1.5 mm, greater than or equal to about 2 mm, greater than or equal to about 2.5 mm, greater than or equal to about 3 mm, greater than or equal to about 3.5 mm, or greater than or equal to about 4 mm. Combinations of the above-referenced ranges are also possible (e.g., greater than or equal to about 0.005 mm and less than or equal to about 5 mm, greater than or equal to about 0.01 mm and less than or equal to about 1 mm). Other values of average thickness are also possible. The thickness may be determined according to the standard ISO 534 at 2.65 lb/in$^2$.

In some embodiments, the second layer may have a mean flow pore size of greater than or equal to about 0.05 microns, greater than or equal to about 0.1 microns, greater than or equal to about 0.15 microns, greater than or equal to about 0.2 microns, greater than or equal to about 0.5 microns, greater than or equal to about 1 micron, greater than or equal to about 10 microns, greater than or equal to about 20 microns, or greater than or equal to about 30 microns. In some instances, the second layer may have a mean flow pore size of less than or equal to about 40 microns, less than or equal to about 30 microns, less than or equal to about 20 microns, less than or equal to about 10 microns, less than or equal to about 5 microns, less than or equal to about 2 microns, or less than or equal to about 1 micron. Combinations of the above-referenced ranges are also possible (e.g., greater than or equal to about 0.05 microns and less than or equal to about 40 microns, greater than or equal to about 0.1 microns and less than or equal to about 30 microns). Other values of mean flow pore size are also possible. The mean flow pore size may be determined according to the standard ASTM F316-03.

In some embodiments, the second layer may have a solidity of less than or equal to about 50%, less than or equal to about 40%, less than or equal to about 30%, less than or equal to about 10%, less than or equal to about 5%, less than or equal to about 1%, less than or equal to about 0.5%, less than or equal to about 0.1%, or less than or equal to about 0.05%. In some instances, the second layer may have a solidity of greater than or equal to about 0.001%, greater than or equal to about 0.005%, greater than or equal to about 0.01%, greater than or equal to about 0.05%, greater than or equal to about 0.1%, greater than or equal to about 0.5%, greater than or equal to about 1%, greater than or equal to about 5%, greater than or equal to about 10%, greater than or equal to about 15%, greater than or equal to about 20%, greater than or equal to about 25%, greater than or equal to about 30%, or greater than or equal to about 40%. It should be understood that combinations of the above-reference ranges are possible (e.g., greater than or equal to about 0.001% and less than or equal to about 50%, greater than or equal to about 0.01% and less than or equal to about 25%). Solidity may be determined as described above.

In certain embodiments, the second layer, described herein, may have a relatively high surface area. For instance, in some embodiments, the second layer may have a surface area of greater than or equal to about 3 m$^2$/g, greater than or equal to about 3.5 m$^2$/g, greater than or equal to about 4 m$^2$/g, greater than or equal to about 4.5 m$^2$/g, greater than or equal to about 5 m$^2$/g, greater than or equal to about 10 m$^2$/g, greater than or equal to about 15 m$^2$/g, greater than or equal to about 20 m$^2$/g, greater than or equal to about 25 m$^2$/g, greater than or equal to about 30 m$^2$/g, greater than or equal to about 35 m$^2$/g, or greater than or equal to about 40 m$^2$/g. In some instances, the second layer may have a surface area of less than or equal to about 50 m$^2$/g, less than or equal to about 45 m$^2$/g, less than or equal to about 40 m$^2$/g, less than or equal to about 35 m$^2$/g, less than or equal to about 30 m$^2$/g, less than or equal to about 25 m$^2$/g, less than or equal to about 20 m$^2$/g, less than or equal to about 15 m$^2$/g, less than or equal to about 10 m$^2$/g, or less than or equal to about 5 m$^2$/g. It should be understood that combinations of the above-reference ranges are possible (e.g., greater than or equal to about 3 m$^2$/g and less than or equal to about 50 m$^2$/g). Surface area may be determined as described above.

In some embodiments, the second layer may be a synthetic membrane layer. In these embodiments, the membrane layer may function as the filtration layer (e.g., efficiency layer). It should be understood that though the description herein generally focuses on filter media that include a fibrous second layer, the description also applies to filter media that include a membranous second layer. For example, in the embodiment shown in FIG. 1, the second layer 20 may be a membrane filtration layer rather than a fiber filtration layer as described above.

In general, any suitable material may be used to form the membrane layer. Suitable materials include synthetic materials such as polytetrafluoroethylene (PTFE) (e.g., expanded or unexpanded), polyvinylidene fluoride (PVDF), polyethylene (e.g., linear low density, ultra high molecular weight), polypropylene, polycarbonate, polyester, nitrocellulose-mixed esters, polyethersulfone, cellulose acetate, polyimide, polyvinylidene fluoride, polyacrylonitrile, polysulfone, polyethersulfone, and polyamide (e.g., nylon), amongst others. In some embodiments, the membrane may comprise a fluorinated polymer, such as PVDF or PTFE.

The membrane layer may be a single layer film or a multilayer film. In embodiments which use multilayer films, the different layers may have different compositions. In general, the membrane layer may be formed by suitable methods that are known in the art.

The membrane layer has a plurality of pores. The pores permit the fluid to pass through while contamination particles are captured on the membrane. In some embodiments, the mean flow pore size of the membrane layer may be greater than or equal to about 0.1 microns, greater than or equal to about 0.15 microns, greater than or equal to about 0.2 microns, greater than or equal to about 0.5 microns, greater than or equal to about 1 micron, greater than or equal to about 10 microns, greater than or equal to about 20 microns, greater than or equal to about 30 microns, or greater than or equal to about 40 microns. In some instances, the membrane may have a mean flow pore size of less than or equal to about 50 microns, less than or equal to about 40 microns, less than or equal to about 30 microns, less than or equal to about 20 microns, less than or equal to about 10 microns, less than or equal to about 5 microns, less than or equal to about 2 microns, or less than or equal to about 1 micron. Combinations of the above-referenced ranges are also possible (e.g., greater than or equal to about 0.1 microns and less than or equal to about 50 microns, greater than or equal to about 0.5 microns and less than or equal to about 40 microns). Other values of average pore size are also possible. The mean flow pore size may be determined according to the standard ASTM F316-08 Method B, BS 6140.

In certain embodiments, the second layer (e.g., an efficiency layer) may include a single layer. In other embodiments, however, the second layer may include more than one layer (i.e., sub-layers) to form a multi-layered structure. When a layer includes more than one sub-layer, the plurality of sub-layers may differ based on certain features such as air permeability, basis weight, fiber type, and/or particulate efficiency. In certain cases, the plurality of sub-layers may be discrete and combined by any suitable method, such as lamination, point bonding, or collating. In some embodiments, the sub-layers are substantially joined to one another (e.g., by lamination, point bonding. thermo-dot bonding, ultrasonic bonding, calendering, use of adhesives (e.g., glue-web), and/or co-pleating). In some cases, sub-layers may be formed as a composite layer (e.g., by a wet laid process).

As described herein, the filter media may include a backer layer (e.g., pleatable backer layer). In some embodiments, the backer layer may have certain enhanced mechanical properties, such as tensile strength, Mullen Burst strength, and tensile elongation. In some such embodiments, the backer layer (e.g., pleatable backer layer) may be relatively strong and may facilitate pleating. For instance, the backer layer may provide sufficient stiffness such that the filter media can be pleated to include sharp, well-defined peaks which can be maintained in a stable configuration during use.

In some embodiments, the backer layer (e.g., pleatable backer layer) may have a tensile strength in the machine direction (MD) of greater than or equal to about 2 lb/in, greater than or equal to about 4 lb/in, greater than or equal to about 5 lb/in, greater than or equal to about 10 lb/in, greater than or equal to about 15 lb/in, greater than or equal to about 20 lb/in, greater than or equal to about 30 lb/in, greater than or equal to about 40 lb/in, greater than or equal to about 50 lb/in, or greater than or equal to about 60 lb/in. In some instances, the tensile strength in the machine direction may be less than or equal to about 70 lb/in, less than or equal to about 60 lb/in, less than or equal to about 50 lb/in, less than or equal to about 40 lb/in, less than or equal to about 30 lb/in, less than or equal to about 20 lb/in, less than or equal to about 10 lb/in, or less than or equal to about 5 lb/in. Combinations of the above-referenced ranges are also possible (e.g., greater than or equal to about 2 lb/in and less than or equal to about 70 lb/in, greater than or equal to about 4 lb/in and less than or equal to about 60 lb/in). Other values of tensile strength in the machine direction are also possible. The tensile strength in the machine direction may be determined according to the standard T494 om-96 using a test span of 4 in and a jaw separation speed of 1 in/min.

In some embodiments, the backer layer (e.g., pleatable backer layer) may have a tensile strength in the cross direction (CD) of greater than or equal to about 1 lb/in, greater than or equal to about 2 lb/in, greater than or equal to about 5 lb/in, greater than or equal to about 10 lb/in, greater than or equal to about 15 lb/in, greater than or equal to about 1 lb/in, greater than or equal to about 20 lb/in, greater than or equal to about 30 lb/in, greater than or equal to about 40 lb/in, greater than or equal to about 50 lb/in, or greater than or equal to about 60 lb/in. In some instances, the tensile strength in the cross direction may be less than or equal to about 70 lb/in, less than or equal to about 60 lb/in, less than or equal to about 50 lb/in, less than or equal to about 40 lb/in, less than or equal to about 30 lb/in, less than or equal to about 20 lb/in, less than or equal to about 10 lb/in, or less than or equal to about 5 lb/in. Combinations of the above-referenced ranges are also possible (e.g., greater than or equal to about 1 lb/in and less than or equal to about 70 lb/in, greater than or equal to about 2 lb/in and less than or equal to about 40 lb/in). Other values of tensile strength in the cross direction are also possible. The tensile strength in the cross direction may be determined according to the standard T494 om-96 using a test span of 4 in and a jaw separation speed of 1 in/min.

In some embodiments, the backer layer (e.g., pleatable backer layer) may have a Mullen Burst strength of greater than or equal to about 5 psi, greater than or equal to about 10 psi, greater than or equal to about 25 psi, greater than or equal to about 50 psi, greater than or equal to about 75 psi, greater than or equal to about 100 psi, greater than or equal to about 125 psi, greater than or equal to about 150 psi, greater than or equal to about 175 psi, greater than or equal to about 200 psi, greater than or equal to about 225 psi, greater than or equal to about 250 psi, or greater than or equal to about 275 psi. In some instances, the Mullen Burst strength may be less than or equal to about 300 psi, less than or equal to about 275 psi, less than or equal to about 250 psi, less than or equal to about 225 psi, less than or equal to about 200 psi, less than or equal to about 175 psi, less than or equal to about 150 psi, less than or equal to about 125 psi, less than or equal to about 100 psi, less than or equal to about 75 psi, less than or equal to about 50 psi, or less than or equal to about 25 psi. Combinations of the above-referenced ranges are also possible (e.g., greater than or equal to about 5 psi and less than or equal to about 300 psi, greater than or equal to about 10 psi and less than or equal to about 200 psi). Other values of Mullen Burst strength are also possible. The Mullen Burst strength may be determined according to the standard T403 om-91.

In some embodiments, the backer layer (e.g., pleatable backer layer) may have a tensile elongation at break in the machine direction of greater than or equal to about 0.1%, greater than or equal to about 0.3%, greater than or equal to about 0.5%, greater than or equal to about 1%, greater than or equal to about 5%, greater than or equal to about 10%, greater than or equal to about 15%, or greater than or equal to about 18%. In some instances, the tensile elongation at break in the machine direction may be less than or equal to about 20%, less than or equal to about 18%, less than or equal to about 15%, less than or equal to about 10%, less than or equal to about 5%, less than or equal to about 1%, or less than or equal to about 0.5%. Combinations of the above-referenced ranges are also possible (e.g., greater than or equal to about 0.1% and less than or equal to about 20%, greater than or equal to about 0.3% and less than or equal to about 5%). Other values of tensile elongation at break in the machine direction are also possible. The tensile elongation at break in the machine direction may be determined according to the standard T494 om-96 using a test span of 4 in and a jaw separation speed of 1 in/min.

In some embodiments, the backer layer (e.g., pleatable backer layer) may have a tensile elongation at break in the cross direction of greater than or equal to about 0.1%, greater than or equal to about 0.3%, greater than or equal to about 0.5%, greater than or equal to about 1%, greater than or equal to about 5%, greater than or equal to about 10%, greater than or equal to about 15%, or greater than or equal to about 18%. In some instances, the tensile elongation at break in the cross direction may be less than or equal to about 20%, less than or equal to about 18%, less than or equal to about 15%, less than or equal to about 10%, less than or equal to about 5%, less than or equal to about 1%, or less than or equal to about 0.5%. Combinations of the above-referenced ranges are also possible (e.g., greater than or equal to about 0.1% and less than or equal to about 20%, greater than or equal to about 0.3% and less than or equal to about 5%). Other values of tensile elongation at break in the cross direction are also possible. The tensile elongation at break in the cross direction may be determined according to the standard T494 om-96 using a test span of 4 in and a jaw separation speed of 1 in/min.

The backer layer (e.g., pleatable backer layer) may have a relatively high stiffness. For instance, in some embodiments, the backer layer may have a stiffness of greater than or equal to about 400 gu, greater than or equal to about 500 gu, greater than or equal to about 750 gu, greater than or equal to about 1,000 gu, greater than or equal to about 1,500 gu, greater than or equal to about 2,000 gu, greater than or equal to about 2,500 gu, greater than or equal to about 3,000 gu, or greater than or equal to about 3,500 gu. In some embodiments, the backer layer may have a stiffness of less than or equal to about 4,000 gu, less than or equal to about 3,500 gu, less than or equal to about 3,000 gu, less than or equal to about 2,500 gu, less than or equal to about 2,000 gu, less than or equal to about 1,500 gu, less than or equal to about 1,000 gu, less than or equal to about 750 gu, or less than or equal to about 500 gu. Combinations of the above-referenced ranges are also possible (e.g., greater than or equal to about 400 gu and less than or equal to about 4,000 gu, greater than or equal to about 500 gu and less than or equal to about 2,500 gu). Other values of stiffness are also possible. The stiffness may be determined according using the Gurley stiffness (bending resistance) recorded in units of gu (equivalent to milligrams) for filter media in the machine direction, in accordance with TAPPI T543 om-94.

In some embodiments, the backer layer (e.g., pleatable backer layer) may comprise fibers having a relatively large diameter. For instance, in some embodiments, the backer layer (e.g., pleatable backer layer) may have a median fiber diameter of greater than or equal to about 3 microns, greater than or equal to about 5 microns, greater than or equal to about 7 microns, greater than or equal to about 10 microns, greater than or equal to about 25 microns, greater than or equal to about 40 microns, greater than or equal to about 55 microns, greater than or equal to about 70 microns, or greater than or equal to about 85 microns. In some instances, the median fiber diameter may be less than or equal to about 100 micron, less than or equal to about 80 microns, less than or equal to about 60 microns, less than or equal to about 40 microns, less than or equal to about 20 microns, less than or equal to about 10 microns, or less than or equal to about 5 microns. Combinations of the above-referenced ranges are also possible (e.g., greater than or equal to about 3 microns and less than or equal to about 100 microns, greater than or equal to about 7 microns and less than or equal to about 60 microns). Other values of median fiber diameter are also possible. In some embodiments, the average diameter of the fibers may fall within the above-referenced ranges for median fiber diameter.

The thickness of the backer layer (e.g., pleatable backer layer) may be selected as desired. For instance, in some embodiments, the backer layer may have a thickness of greater than or equal to about 0.1 mm, greater than or equal to about 0.5 mm, greater than or equal to about 1 mm, greater than or equal to about 3 mm, greater than or equal to about 5 mm, greater than or equal to about 8 mm, greater than or equal to about 10 mm, or greater than or equal to about 12 mm. In some instances, the backer layer may have a thickness of less than or equal to about 15 mm, less than or equal to about 12 mm, less than or equal to about 10 mm, less than or equal to about 8 mm, less than or equal to about 5 mm, or less than or equal to about 2 mm. Combinations of the above-referenced ranges are also possible (e.g., greater than or equal to about 0.1 mm and less than or equal to about 15 mm, greater than or equal to about 0.1 mm and less than or equal to about 5 mm). Other values of average thickness are also possible. The thickness may be determined according to the standard ISO 534 at 2.65 lbs/in$^2$.

In some embodiments, the backer layer (e.g., pleatable backer layer) may have a basis weight of greater than or equal to about 20 g/m$^2$, greater than or equal to about 30 g/m$^2$, greater than or equal to about 50 g/m$^2$, greater than or equal to about 75 g/m$^2$, greater than or equal to about 100 g/m$^2$, greater than or equal to about 125 g/m$^2$, greater than or equal to about 150 g/m$^2$, greater than or equal to about 175 g/m$^2$, greater than or equal to about 200 g/m$^2$, greater than or equal to about 225 g/m$^2$, greater than or equal to about 250 g/m$^2$, or greater than or equal to about 275 g/m$^2$. In some instances, the backer layer may have a basis weight of less than or equal to about 300 g/m$^2$, less than or equal to about 275 g/m$^2$, less than or equal to about 250 g/m$^2$, less than or equal to about 225 g/m$^2$, less than or equal to about 200 g/m$^2$, less than or equal to about 175 g/m$^2$, less than or equal to about 150/m$^2$, less than or equal to about 125 g/m$^2$, less than or equal to about 100 g/m$^2$, less than or equal to about 75 g/m$^2$, less than or equal to about 50 g/m$^2$, or less than or equal to about 25 g/m$^2$. Combinations of the above-referenced ranges are also possible (e.g., greater than or equal to about 20 g/m$^2$ and less than or equal to about 300 g/m$^2$, greater than or equal to about 50 g/m$^2$ and less than or equal to about 150 g/m$^2$). Other values of basis weight are also possible. The basis weight may be determined according to the standard ISO 536.

In some embodiments, the backer layer may (e.g., pleatable backer layer) have a relatively low DOP efficiency. For instance, in embodiments, the backer layer may have a DOP efficiency of less than or equal to about 20%, DOP efficiency of less than or equal to about 15%, DOP efficiency of less than or equal to about 10%, DOP efficiency of less than or equal to about 5%, DOP efficiency of less than or equal to about 2%, or DOP efficiency of less than or equal to about 1%. The DOP efficiency may be measured as described above.

In some embodiments, the backer layer (e.g., pleatable backer layer) may have a relatively high air permeability. For instance, in some embodiments, the air permeability of the backer layer may be greater than or equal to about 50 ft$^3$/min/ft$^2$ (CFM), greater than or equal to about 75 CFM, greater than or equal to about 100 CFM, greater than or equal to about 250 CFM, greater than or equal to about 500 CFM, greater than or equal to about 1,000 CFM, greater than or equal to 1,250 CFM, greater than or equal to about 1,500 CFM, or greater than or equal to about 1,750 CFM. In some instances, the air permeability of the backer layer (e.g., pleatable backer layer) may be less than or equal to about 2,000 CFM, less than or equal to about 1,750 CFM, less than or equal to about 1,500 CFM, less than or equal to about 1,250 CFM, less than or equal to about 1,000 CFM, less than or equal to about 750 CFM, less than or equal to about 500 CFM, less than or equal to about 250 CFM, less than or equal to about 100 CFM, or less than or equal to about 75 CFM. It should be understood that all combinations of the above-referenced ranges are possible (e.g., greater than or equal to about 50 CFM and less than or equal to about 2,000 CFM, greater than or equal to about 100 CFM and less than or equal to about 1,00 CFM). Other ranges are also possible. The air permeability may be determined according to ASTM D737-75 as described above.

As noted above, filter media 10, described herein, may be used for a wide range of applications that may require a certain level of particulate efficiency. For example, the filter media may meet the highest EN1822 filter classification (e.g., ultra-high particulate efficiency, ULPA) and, accordingly, may exhibit efficiencies greater than or equal to about 99.9995%. Or, the filter media may be suitable for HVAC applications, which is categorized according to a particulate efficiency of greater than or equal to about 15% and less than or equal to about 90% or greater than or equal to about 35% and less than or equal to about 90%. For high particulate efficiency applications (e.g., HEPA), the filter media exhibits a particulate efficiency of greater than or equal to about 99.5% and less than or equal to about 99.995%.

In some embodiments, the filter media may have a DOP particle filtration efficiency of greater than or equal to about 15%, greater than or equal to about 20%, greater than or equal to about 35%, greater than or equal to about 50%, greater than or equal to about 60%, greater than or equal to about 70%, greater than or equal to about 80%, greater than or equal to about 90%, greater than or equal to about 95%, greater than or equal to about 97%, greater than or equal to about 99%, greater than or equal to about 99.5%, greater than or equal to about 99.9%, greater than or equal to about 99.95%, greater than or equal to about 99.99%, or greater than or equal to about 99.995%. In some instances, the filter media may have a DOP efficiency of less than or equal to about 99.99999%, less than or equal to about 99.999%, less than or equal to about 99.99%, less than or equal to about 99.997%, less than or equal to about 99.995%, less than or equal to about 99.9%, less than or equal to about 99.5%, less than or equal to about 99%, less than or equal to about 98%, less than or equal to about 97%, less than or equal to about 95%, less than or equal to about 90%, less than or equal to about 85%, less than or equal to about 75%, less than or equal to about 60%, less than or equal to about 50%, less than or equal to about 40%, less than or equal to about 30%, less than or equal to about 20%, or less than or equal to about 10%. It should be understood that all combinations of the above-referenced ranges are possible. In some embodiments, NaCl particle efficiency of the filter media may range as described above with respect to the DOP efficiency of the filter media. Other ranges and values of NaCl particle filtration efficiency are also possible. In some embodiments, the DOP efficiency is determined as described herein.

In general, the filter media may have a relatively high gamma. In some instances, the filter media may have a gamma of greater than or equal to about 7, greater than or equal to about 10, greater than or equal to about 12, greater than or equal to about 15, greater than or equal to about 20, greater than or equal to about 30, greater than or equal to about 40, greater than or equal to about 50, or greater than or equal to about 60. In some instances, the filter media may have a gamma of less than or equal to about 75, less than or equal to about 60, less than or equal to about 50, less than or equal to about 40, less than or equal to about 30, less than or equal to about 25, less than or equal to about 20, less than or equal to about 15, or less than or equal to about 10. It should be understood that all combinations of the above-reference ranges are possible (e.g., greater than or equal to about 7 and less than or equal to about 75, greater than or equal to about 10 and less than or equal to about 75, greater than or equal to about 20 and less than or equal to about 75). In some embodiments, the gamma is determined as described herein.

In some embodiments, the filter media comprising the pre-filter layer, described herein, may have a relatively small change in pressure drop over time. For instance, the change in pressure drop after 30 minutes of DOP loading may be less than or equal to about 350%, less than or equal to about 325%, less than or equal to about 300%, less than or equal to about 275%, less than or equal to about 250%, less than or equal to about 225%, less than or equal to about 200%, less than or equal to about 175%, less than or equal to about 150%, less than or equal to about 125%, less than or equal to about 100%, less than or equal to about 75%, less than or equal to about 50%, or less than or equal to about 25%.

In some embodiments, the change in pressure drop after 30 minutes of NaCl loading may be less than or equal to about 250%, less than or equal to about 225%, less than or equal to about 200%, less than or equal to about 175%, less than or equal to about 150%, less than or equal to about 125%, less than or equal to about 100%, less than or equal to about 75%, less than or equal to about 50%, or less than or equal to about 25%.

The change in pressure drop at 30 minutes using DOP or NaCl particles may be determined by comparing the pressure drop at 30 minutes to the first pressure drop reading that occurs at the beginning of the test. The pressure drop is determined as described above.

In some embodiments, the pre-filter layer may not significantly contribute to the pressure drop of the filter media, such that the overall pressure drop of the filter media is similar to the air flow resistance of the efficiency layer. For instance, in some embodiments, the filter media may have a pressure drop of greater than or equal to about 0.75 mm $H_2O$, greater than or equal to about 1 mm $H_2O$, greater than or equal to about 5 mm $H_2O$, greater than or equal to about 10 mm $H_2O$, greater than or equal to about 25 mm $H_2O$, greater than or equal to about 50 mm $H_2O$, greater than or equal to about 75 mm $H_2O$, greater than or equal to about 100 mm $H_2O$, or greater than or equal to about 125 mm $H_2O$. In some instances, the pressure drop may be less than or equal to about 160 mm $H_2O$, less than or equal to about 125 mm $H_2O$, less than or equal to about 100 mm $H_2O$, less than or equal to about 90 mm $H_2O$, less than or equal to about 75 mm $H_2O$, less than or equal to about 50 mm $H_2O$, less than or equal to about 25 mm $H_2O$, or less than or equal to about 10 mm $H_2O$. It should be understood that combinations of the above-referenced ranges are possible (e.g., greater than or equal to about 0.75 mm $H_2O$ and less than or equal to about 160 mm $H_2O$, greater than or equal to about 1 mm $H_2O$ and less than or equal to about 100 mm $H_2O$). Other ranges and values of pressure drop are also possible. In some embodiments, the pressure drop is determined as described herein.

In general, the structural characteristics may vary depending the filtration application (e.g., HEPA, ASHRAE, ULPA, facemask, etc.), and the materials used to form the filter media.

In some embodiments, the filter media may have a stiffness of greater than or equal to about 400 gu, greater than or equal to about 500 gu, greater than or equal to about 700 gu, greater than or equal to about 1,000 gu, greater than or equal to about 1,500 gu, greater than or equal to about 2,000 gu, or greater than or equal to about 2,500 gu. In some embodiments, the filter media may have a stiffness of less than or equal to about 3,000 gu, less than or equal to about 2,500 gu, less than or equal to about 2,000 gu, less than or equal to about 1,500 gu, less than or equal to about 1,000 gu, less than or equal to about 750 gu, or less than or equal to about 500 gu. Combinations of the above-referenced ranges are also possible (e.g., greater than or equal to about 400 gu and less than or equal to about 3,000 gu, greater than or equal to about 7000 gu and less than or equal to about 2,000 gu). Other values of stiffness are also possible. In some embodiments, the stiffness is determined as described herein.

In some embodiments, the filter media may have a basis weight of greater than or equal to about 25 g/m$^2$, greater than or equal to about 60 g/m$^2$, greater than or equal to about 100 g/m$^2$, greater than or equal to about 150 g/m$^2$, greater than or equal to about 200 g/m$^2$, greater than or equal to about 250 g/m$^2$, greater than or equal to about 300 g/m$^2$, greater than or equal to about 350 g/m$^2$, greater than or equal to about 400 g/m$^2$, greater than or equal to about 450 g/m$^2$, greater than or equal to about 500 g/m$^2$, or greater than or equal to about 550 g/m$^2$. In some instances, the filter media may have a basis weight of less than or equal to about 600 g/m$^2$, less than or equal to about 550 g/m$^2$, less than or equal to about 500 g/m$^2$, less than or equal to about 450 g/m$^2$, less than or equal to about 400 g/m$^2$, less than or equal to about 350 g/m$^2$, less than or equal to about 300 g/m$^2$, less than or equal to about 250 g/m$^2$, less than or equal to about 200 g/m$^2$, less than or equal to about 150 g/m$^2$, or less than or equal to about 100 g/m$^2$. Combinations of the above-referenced ranges are also possible (e.g., greater than or equal to about 60 g/m$^2$ and less than or equal to about 300 g/m$^2$, greater than or equal to about 25 g/m$^2$ and less than or equal to about 600 g/m$^2$). Other values of basis weight are also possible. The basis weight may be determined according to the standard ISO 536.

In some embodiments, the filter media may have a thickness of greater than or equal to about 0.05 mm, greater than or equal to about 0.01 mm, greater than or equal to about 0.1 mm, greater than or equal to about 0.5 mm, greater than or equal to about 1 mm, greater than or equal to about 5 mm, greater than or equal to about 8 mm, greater than or equal to about 10 mm, greater than or equal to about 12 mm, greater than or equal to about 15 mm, greater than or equal to about 18 mm, or greater than or equal to about 20 mm. In some instances, the filter media may have a thickness of less than or equal to about 25 mm, less than or equal to about 20 mm, less than or equal to about 18 mm, less than or equal to about 15 mm, less than or equal to about 12 mm, less than or equal to about 10 mm, less than or equal to about 8 mm, less than or equal to about 5 mm, or less than or equal to about 2 mm. Combinations of the above-referenced ranges are also possible (e.g., greater than or equal to about 0.05 mm and less than or equal to about 25 mm, greater than or equal to about 0.1 mm and less than or equal to about 10 mm). Other values of average thickness are also possible. The thickness may be determined according to the standard ISO 534 at 2.65 lbs/in$^2$.

In general, any layer in the filter media may include any suitable fiber type. In some embodiments, one or more layer and/or entire filter media may include more than one type of fiber. For example, in certain embodiments, one or more layer and/or the entire filter media may include one or more of a synthetic fiber, a cellulose fiber (e.g., regenerated, Lyocell, etc.), and/or a glass fiber as described herein.

In some embodiments, the fibers in a layer (e.g., pre-filter layer, second layer) may also have an average length which may depend on the method of formation of the fibers. For instance, in some embodiments, fibers formed by a melt-blown, a meltspun, an electrospinning (e.g., solvent electrospinning, melt electrospinning) or centrifugal spinning process may be continuous (e.g., greater than about 2 inches, greater than about 3 inches, greater than about 5 inches).

In some embodiments, filter media 10 may comprise synthetic fibers. For instance, in some embodiments, pre-filter layer 15 and/or second layer 20 may comprise synthetic fibers. The synthetic fibers may have a relatively small median fiber diameter (e.g., less than or equal to about 2 microns). For instance, the synthetic fibers in pre-filter layer 15 may have a median diameter of less than or equal to about 2 microns (e.g., between about 0.5 microns and about 1.0 micron). The synthetic fibers in the second layer (e.g., efficiency layer) may have a median diameter of less than or equal to about 1 micron (e.g., between about 0.1 microns and 0.5 microns). In embodiments in which the second layer comprises more than one sub-layer, at least one sub-layer may comprise synthetic fibers. For instance, at least two sub-layers (e.g., all sub-layers) may comprise synthetic fibers. In some such embodiments, a sub-layer comprising synthetic fibers may have substantially the same or a different median fiber diameter than another sub-layer. In some embodiments, the synthetic fibers in pre-filter layer 15, second layer 20, and/or filter media 10 may be continuous fibers formed by any suitable process (e.g., a melt-blown, a meltspun, an electrospinning (e.g., melt electrospinning, solvent electrospinning), or centrifugal spinning process). In certain embodiments, the synthetic fibers may be formed by an electrospinning process. In other embodiments, the synthetic fibers may be non-continuous. In some embodiments, all of the fibers in the filter media are synthetic fibers. In certain embodiments, all of the fibers in pre-filter layer 15 and/or second layer 20 are synthetic fibers.

Synthetic fibers may include any suitable type of synthetic polymer. Examples of suitable synthetic fibers include polyesters (e.g., polyethylene terephthalate, polybutylene terephthalate), polycarbonate, polyamides (e.g., various nylon polymers), polyaramid, polyimide, polyethylene, polypropylene, polyether ether ketone, polyolefin, acrylics, polyvinyl alcohol, regenerated cellulose (e.g., synthetic cellulose such lyocell, rayon), polyacrylonitriles, polyvinylidene fluoride (PVDF), copolymers of polyethylene and PVDF, polyether sulfones, and combinations thereof. In some embodiments, the synthetic fibers are organic polymer fibers. Synthetic fibers may also include multi-component fibers (i.e., fibers having multiple compositions such as bicomponent fibers). In some cases, synthetic fibers may include meltblown, meltspun, electrospun (e.g., melt, solvent), or centrifugal spun fibers, which may be formed of polymers described herein (e.g., polyester, polypropylene). In some embodiments, synthetic fibers may be electrospun fibers. The filter media, as well as each of the layers (or sub-layers) within the filter media, may also include combinations of more than one type of synthetic fiber. It should be understood that other types of synthetic fiber types may also be used.

In some embodiments, the median diameter of the synthetic fibers of one or more layers (e.g., a pre-filter layer, a second layer) and/or the entire filter media may be, for example, greater than or equal to about 0.1 microns, greater than or equal to about 0.3 microns, greater than or equal to about 0.5 microns, greater than or equal to about 1 micron, greater than or equal to about 2 microns, greater than or equal to about 3 microns, greater than or equal to about 4 microns, greater than or equal to about 5 microns, greater than or equal to about 8 microns, greater than or equal to about 10 microns, greater than or equal to about 12 microns, greater than or equal to about 15 microns, or greater than or equal to about 20 microns. In some instances, the synthetic fibers may have a median diameter of less than or equal to about 30 microns, less than or equal to about 20 microns, less than or equal to about 15 microns, less than or equal to about 10 microns, less than or equal to about 7 microns, less than or equal to about 5 microns, less than or equal to about 4 microns, less than or equal to about 1.5 microns, less than or equal to about 1 micron, less than or equal to about 0.8 microns, or less than or equal to about 0.5 microns. Combinations of the above-referenced ranges are also possible (e.g., greater than or equal to about 1 micron and less than or equal to about 5 microns). Other values of median fiber diameter are also possible. In certain embodiments, the ranges of median fiber diameter described above may apply to the synthetic fibers of the overall media (e.g., the overall media may comprise synthetic fibers having a median fiber diameter in one or more of the ranges described above). In some embodiments, the average diameter of the fibers may fall within the above-referenced ranges for median fiber diameter.

In some cases, the synthetic fibers may be continuous (e.g., meltblown fibers, spunbond fibers, electrospun fibers, centrifugal spun fibers, etc.). For instance, synthetic fibers may have an average length of at least about 5 cm, at least about 10 cm, at least about 15 cm, at least about 20 cm, at least about 50 cm, at least about 100 cm, at least about 200 cm, at least about 500 cm, at least about 700 cm, at least about 1000, at least about 1500 cm, at least about 2000 cm, at least about 2500 cm, at least about 5000 cm, at least about 10000 cm; and/or less than or equal to about 10000 cm, less than or equal to about 5000 cm, less than or equal to about 2500 cm, less than or equal to about 2000 cm, less than or equal to about 1000 cm, less than or equal to about 500 cm, or less than or equal to about 200 cm. Combinations of the above-referenced ranges are also possible (e.g., greater than or equal to about 100 cm and less than or equal to about 2500 cm). Other values of average fiber length are also possible.

In other embodiments, the synthetic fibers are not continuous (e.g., staple fibers). In general, synthetic non-continuous fibers may be characterized as being shorter than continuous synthetic fibers. For instance, in some embodiments, synthetic fibers in one or more layers in the filter media may have an average length of at least about 0.1 mm, at least about 0.5 mm, at least about 1.0 mm, at least about 1.5 mm, at least about 2.0 mm, at least about 3.0 mm, at least about 4.0 mm, at least about 5.0 mm, at least about 6.0 mm, at least about 7.0 mm, at least about 8.0 mm, at least about 9.0 mm, at least about 10.0 mm, at least about 12.0 mm, at least about 15.0 mm; and/or less than or equal to about 15.0 mm, less than or equal to about 12.0 mm, less than or equal to about 10.0 mm, less than or equal to about 5.0 mm, less than or equal to about 4.0 mm, less than or equal to about 1.0 mm, less than or equal to about 0.5 mm, or less than or equal to about 0.1 mm. Combinations of the above-referenced ranges are also possible (e.g., at least about 1.0 mm and less than or equal to about 4.0 mm). Other values of average fiber length are also possible.

In some embodiments in which synthetic fibers are included in one or more layers and/or the entire filter media, the weight percentage of synthetic fibers in one or more layers (e.g., pre-filter layer, second layer) and/or the entire filter media may be greater than or equal to about 1%, greater than or equal to about 20%, greater than or equal to about 40%, greater than or equal to about 60%, greater than or equal to about 80%, greater than or equal to about 90%, or greater than or equal to about 95%. In some instances, the weight percentage of synthetic fibers in the second layer may be less than or equal to about 100%, less than or equal to about 98%, less than or equal to about 85%, less than or equal to about 75%, less than or equal to about 50%, or less than or equal to about 10%. Combinations of the above-referenced ranges are also possible (e.g., greater than or equal to about 80% and less than or equal to about 100%). Other values of weight percentage of synthetic fibers are also possible. In some embodiments, one or more layers (e.g., pre-filter layer, second layer) and/or the entire filter media includes 100% synthetic fibers. In other embodiments, one or more layers and/or the entire filter media may include 0% synthetic fibers.

In one set of embodiments, one or more layers in the filter media may include bicomponent fibers. The bicomponent fibers may comprise a thermoplastic polymer. Each component of the bicomponent fiber can have a different melting temperature. For example, the fibers can include a core and a sheath where the activation temperature of the sheath is lower than the melting temperature of the core. This allows the sheath to melt prior to the core, such that the sheath binds to other fibers in the layer, while the core maintains its structural integrity. The core/sheath binder fibers can be concentric or non-concentric. Other exemplary bicomponent fibers can include split fiber fibers, side-by-side fibers, and/or "island in the sea" fibers.

In some embodiments, bicomponent fibers may have an average length of at least about 0.1 mm, at least about 0.5 mm, at least about 1.0 mm, at least about 1.5 mm, at least about 2.0 mm, at least about 3.0 mm, at least about 4.0 mm, at least about 5.0 mm, at least about 6.0 mm, at least about 7.0 mm, at least about 8.0 mm, at least about 9.0 mm, at least about 10.0 mm, at least about 12.0 mm, at least about 15.0 mm; and/or less than or equal to about 15.0 mm, less than or equal to about 12.0 mm, less than or equal to about 10.0 mm, less than or equal to about 5.0 mm, less than or equal to about 4.0 mm, less than or equal to about 1.0 mm, less than or equal to about 0.5 mm, or less than or equal to about 0.1 mm. Combinations of the above-referenced ranges are also possible (e.g., at least about 1.0 mm and less than or equal to about 4.0 mm). Other values of average fiber length are also possible.

In some embodiments in which bicomponent fibers are included in one or more layers (e.g., pre-filter layer, second layer) and/or the entire filter media, the weight percentage of bicomponent fibers in one or more layers and/or the entire filter media may be, for example, greater than or equal to about 1%, greater than or equal to about 2%, greater than or equal to about 3%, greater than or equal to about 5%, greater than or equal to about 10%, or greater than or equal to about 15%. In some instances, the weight percentage of bicomponent fibers in one or more layers and/or the entire filter media may be less than or equal to about 20%, less than or equal to about 15%, less than or equal to about 10%, less than or equal to about 5%, less than or equal to about 4%, or less than or equal to about 2%. Combinations of the above-referenced ranges are also possible (e.g., greater than or equal to about 1% and less than or equal to about 10%). Other values of weight percentage of the bicomponent fibers are also possible. In other embodiments, one or more layers (e.g., pre-filter layer, second layer) and/or the entire filter media may include 0% bicomponent fibers.

In some embodiments, one or more layers in the filter media may include one or more cellulose fibers, such as softwood fibers, hardwood fibers, a mixture of hardwood and softwood fibers, regenerated cellulose fibers, and mechanical pulp fibers (e.g., groundwood, chemically treated mechanical pulps, and thermomechanical pulps).

The median diameter of the cellulose fibers in one or more layers (e.g., pre-filter layer, second layer) and/or the entire filter media may be, for example, greater than or equal to about 1 micron, greater than or equal to about 2 microns, greater than or equal to about 3 microns, greater than or equal to about 4 microns, greater than or equal to about 5 microns, greater than or equal to about 8 microns, greater than or equal to about 10 microns, greater than or equal to about 15 microns, greater than or equal to about 20 microns, greater than or equal to about 30 microns, or greater than or equal to about 40 microns. In some instances, the cellulose fibers may have a median diameter of less than or equal to about 50 microns, less than or equal to about 40 microns, less than or equal to about 30 microns, less than or equal to about 20 microns, less than or equal to about 15 microns, less than or equal to about 10 microns, less than or equal to about 7 microns, less than or equal to about 5 microns, less than or equal to about 4 microns, or less than or equal to about 2 microns. Combinations of the above-referenced ranges are also possible (e.g., greater than or equal to about 1 micron and less than or equal to about 5 microns). Other values of median fiber diameter are also possible. In some embodiments, the average diameter of the fibers may fall within the above-referenced ranges for median fiber diameter.

In some embodiments, the cellulose fibers may have an average length. For instance, in some embodiments, cellulose fibers may have an average length of greater than or equal to about 0.5 mm, greater than or equal to about 1 mm, greater than or equal to about 2 mm, greater than or equal to about 3 mm, greater than or equal to about 4 mm, greater than or equal to about 5 mm, greater than or equal to about 6 mm, or greater than or equal to about 8 mm. In some instances, cellulose fibers may have an average length of less than or equal to about 10 mm, less than or equal to about 8 mm, less than or equal to about 6 mm, less than or equal to about 4 mm, less than or equal to about 2 mm, or less than or equal to about 1 mm. Combinations of the above-referenced ranges are also possible (e.g., greater than or equal to about 1 mm and less than or equal to about 3 mm). Other values of average fiber length are also possible.

In certain embodiments, one or more layers and/or the entire filter media may optionally include cellulose fibers, such as regenerated cellulose (e.g., rayon, Lyocell), fibrillated synthetic fibers, microfibrillated cellulose, and natural cellulose fibers (e.g., hardwood, softwood). For instance, in some embodiments, the weight percentage of cellulose fibers in one or more layers and/or the entire filter media may be greater than or equal to about 1%, greater than or equal to about 5%, greater than or equal to about 10%, greater than or equal to about 15%, greater than or equal to about 45%, greater than or equal to about 65%, or greater than or equal to about 90%. In some instances, the weight percentage of the cellulose fibers in the second layer may be less than or equal to about 100%, less than or equal to about 85%, less than or equal to about 55%, less than or equal to about 20%, less than or equal to about 10%, or less than or equal to about 2%. Combinations of the above-referenced ranges are also possible (e.g., greater than or equal to about 1% and less than or equal to about 20%). Other values of weight percentage of the cellulose fibers in one or more layers and/or the entire filter media are also possible. In some embodiments, one or more layers and/or the entire filter media includes 100% cellulose fibers. In other embodiments, one or more layers and/or the entire filter media may include 0% cellulose fibers.

In some embodiments, one or more layers in the filter media may include fibrillated fibers. As known to those of ordinary skill in the art, a fibrillated fiber includes a parent fiber that branches into smaller diameter fibrils, which can, in some instances, branch further out into even smaller diameter fibrils with further branching also being possible. The branched nature of the fibrils leads to a layer and/or fiber web having a high surface area and can increase the number of contact points between the fibrillated fibers and other fibers in the web. Such an increase in points of contact between the fibrillated fibers and other fibers and/or components of the web may contribute to enhancing mechanical properties (e.g., flexibility, strength) and/or filtration performance properties of the layer and/or fiber web.

In some embodiments the parent fibers may have a median diameter in the micron range. For example, the parent fibers may have a median diameter of greater than or equal to about 1 micron, greater than or equal to about 5 microns, greater than or equal to about 10 microns, greater than or equal to about 20 microns, greater than or equal to about 30 microns, greater than or equal to about 40 microns, greater than or equal to about 50 microns, greater than or equal to about 60 microns, or greater than or equal to about 70 microns. In some embodiments, the parent fibers may have a median diameter of less than or equal to about 75 microns, less than or equal to about 55 microns, less than or equal to about 35 microns, less than or equal to about 25 microns, less than or equal to about 15 microns, less than or equal to about 10 microns, or less than or equal to about 5 microns. Combinations of the above referenced ranges are also possible (e.g., parent fibers having a median diameter of greater than or equal to about 1 micron and less than or equal to about 25 microns). Other ranges are also possible. In some embodiments, the average diameter of the fibers may fall within the above-referenced ranges for median fiber diameter.

In other embodiments, the parent fibers may have a median diameter in the nanometer range. For instance in, some embodiments, the parent fibers may have a median diameter of less than about 1 micron, less than or equal to about 0.8 microns, less than or equal to about 0.5 microns, or less than or equal to about 0.1 microns. In some embodiments, the parent fibers may have a median diameter of greater than or equal to about 0.1 microns, or greater than or equal to about 0.5 microns. Combinations of the above referenced ranges are also possible (e.g., parent fibers having a median diameter of greater than or equal to about 0.004 microns and less than about or equal to about 0.02 microns). Other ranges are also possible. In some embodiments, the average diameter of the fibers may fall within the above-referenced ranges for median fiber diameter.

The median diameter of the fibrils is generally less than the average diameter of the parent fibers. Depending on the median diameter of the parent fibers, in some embodiments, the fibrils may have a median diameter of less than or equal to about 25 microns, less than or equal to about 20 microns, less than or equal to about 10 microns, less than or equal to about 5 microns, less than or equal to about 1 micron, less than or equal to about 0.5 microns, less than or equal to about 0.1 microns, less than or equal to about 0.05 microns, or less than or equal to about 0.01 microns. In some embodiments the fibrils may have a median diameter of greater than or equal to about 0.003 microns, greater than or equal to about 0.01 micron, greater than or equal to about 0.05 microns, greater than or equal to about 0.1 microns, greater than or equal to about 0.5 microns greater than or equal to about 1 micron, greater than or equal to about 5 microns, greater than or equal to about 10 microns, or greater than or equal to about 20 microns. Combinations of the above referenced ranges are also possible (e.g., fibrils having a median diameter of greater than or equal to about 0.01 microns and less than or equal to about 20 microns). Other ranges are also possible.

In some embodiments, the average length of a fibrillated fiber may be less than or equal to about 10 mm, less than or equal to about 8 mm, less than or equal to about 6 mm, less than or equal to about 5 mm, less than or equal to about 4 mm, less than or equal to about 3 mm, or less than or equal to about 2 mm. In certain embodiments, the average length of fibrillated fibers may be greater than or equal to about 1 mm, greater than or equal to about 2 mm, greater than or equal to about 4 mm, greater than or equal to about 5 mm, greater than equal to about 6 mm, or greater than or equal to about 8 mm. Combinations of the above referenced ranges are also possible (e.g., fibrillated fibers having an average length of greater than or equal to about 4 mm and less than about 6 mm). Other ranges are also possible. The average length of the fibrillated fibers refers to the average length of parent fibers from one end to an opposite end of the parent fibers. In some embodiments, the maximum average length of the fibrillated fibers falls within the above-noted ranges. The maximum average length refers to the average of the maximum dimension along one axis of the fibrillated fibers (including parent fibers and fibrils). It should be understood that, in certain embodiments, the fibers and fibrils may have dimensions outside the above-noted ranges.

The level of fibrillation of the fibrillated fibers may be measured according to any number of suitable methods. For example, the level of fibrillation can be measured according to a Canadian Standard Freeness (CSF) test, specified by TAPPI test method T 227 om 09 Freeness of pulp. The test can provide an average CSF value. In some embodiments, the average CSF value of the fibrillated fibers may vary between about 10 mL and about 750 mL. In certain embodiments, the average CSF value of the fibrillated fibers used in a layer may be greater than or equal to about 10 mL, greater than or equal to about 50 mL, greater than or equal to about 100 mL, greater than or equal to about 200 mL, greater than or equal to about 400 mL, greater than or equal to about 600 mL, or greater than or equal to about 700 mL. In some embodiments, the average CSF value of the fibrillated fibers may be less than or equal to about 800 mL, less than or equal to about 600 mL, less than or equal to about 400 mL, less than or equal to about 200 mL, less than or equal to about 100 mL, or less than or equal to about 50 mL. Combinations of the above-referenced ranges are also possible (e.g., an average CSF value of fibrillated fibers of greater than or equal to about 10 mL and less than or equal to about 300 mL). Other ranges are also possible. The average CSF value of the fibrillated fibers may be based on one type of fibrillated fiber or more than one type of fibrillated fiber.

In certain embodiments, one or more layers may optionally include fibrillated fibers, such as fibrillated regenerated cellulose (e.g., rayon, Lyocell), microfibrillated cellulose, fibrillated synthetic fibers, and fibrillated natural cellulose fibers (e.g., hardwood, softwood). For instance, in some embodiments, the weight percentage of fibrillated fibers in one or more layers and/or the entire filter media may be greater than or equal to about 1%, greater than or equal to about 5%, greater than or equal to about 10%, greater than or equal to about 15%, greater than or equal to about 45%, greater than or equal to about 65%, or greater than or equal to about 90%. In some instances, the weight percentage of the fibrillated fibers in the second layer may be less than or equal to about 100%, less than or equal to about 85%, less than or equal to about 55%, less than or equal to about 20%, less than or equal to about 10%, or less than or equal to about 2%. Combinations of the above-referenced ranges are also possible (e.g., greater than or equal to about 1% and less than or equal to about 20%). Other values of weight percentage of the fibrillated fibers in the second layer are also possible. In some embodiments, one or more layers include 100% fibrillated fibers. In other embodiments, one or more layers may include 0% fibrillated fibers.

In some embodiments, one or more layers (e.g., pre-filter layer, second layer) and/or the entire filter media is substantially free of glass fibers (e.g., less than 1 wt % glass fibers). For instance, the pre-filter layer, second layer, and/or the entire filter media may include 0 wt % glass fibers. Filter media and arrangements that are substantially free of glass fibers may be advantageous for certain applications in which incineration of the filter media after use is preferred. In other embodiments, however, one or more layers and/or the entire filter media may include glass fibers (e.g., microglass fibers, chopped strand glass fibers, or a combination thereof.

The median diameter of glass fibers may be, for example, less than or equal to about 30 microns, less than or equal to about 25 microns, less than or equal to about 15 microns, less than or equal to about 12 microns, less than or equal to about 10 microns, less than or equal to about 9 microns, less than or equal to about 7 microns, less than or equal to about 5 microns, less than or equal to about 3 microns, or less than or equal to about 1 micron. In some instances, the glass fibers may have a median fiber diameter of greater than or equal to about 0.1 microns, greater than or equal to about 0.3 microns, greater than or equal to about 1 micron, greater than or equal to about 3 microns, or greater than equal to about 7 microns greater than or equal to about 9 microns, greater than or equal to about 11 microns, or greater than or equal to about 20 microns. Combinations of the above-referenced ranges are also possible (e.g., greater than or equal to about 0.1 microns and less than or equal to about 9 microns). Other values of median fiber diameter are also possible.

In some embodiments, the average length of microglass fibers may be less than or equal to about 10 mm, less than or equal to about 8 mm, less than or equal to about 6 mm, less than or equal to about 5 mm, less than or equal to about 4 mm, less than or equal to about 3 mm, or less than or equal to about 2 mm. In certain embodiments, the average length of microglass fibers may be greater than or equal to about 1 mm, greater than or equal to about 2 mm, greater than or equal to about 4 mm, greater than or equal to about 5 mm, greater than equal to about 6 mm, or greater than or equal to about 8 mm. Combinations of the above referenced ranges are also possible (e.g., microglass fibers having an average length of greater than or equal to about 4 mm and less than about 6 mm). Other ranges are also possible.

In general, chopped strand glass fibers may have an average fiber diameter that is greater than the diameter of the microglass fibers. In some embodiments, chopped strand glass fibers may have a length in the range of between about 0.125 inches and about 1 inch (e.g., about 0.25 inches, or about 0.5 inches). In some embodiments, the average length of chopped strand glass fibers may be less than or equal to about 1 inch, less than or equal to about 0.8 inches, less than or equal to about 0.6 inches, less than or equal to about 0.5 inches, less than or equal to about 0.4 inches, less than or equal to about 0.3 inches, or less than or equal to about 0.2 inches. In certain embodiments, the average length of chopped strand glass fibers may be greater than or equal to about 0.125 inches, greater than or equal to about 0.2 inches, greater than or equal to about 0.4 inches, greater than or equal to about 0.5 inches, greater than equal to about 0.6 inches, or greater than or equal to about 0.8 inches. Combinations of the above referenced ranges are also possible (e.g., chopped strand glass fibers having an average length of greater than or equal to about 0.125 inches and less than about 1 inch). Other ranges are also possible.

In some embodiments, one or more layers (e.g., pre-filter layer, second layer) and/or the entire filter media may include relatively low amounts of glass fibers. For instance, the second layer may include less than or equal to about 10 wt %, less than or equal to about 5 wt %, less than or equal to about 2 wt %, or less than or equal to about 1 wt % glass fibers. In some cases, the pre-filter layer, second layer, and/or entire filter media may be substantially free of glass fibers (e.g., less than 1 wt % glass fibers, such as 0 wt % glass fibers).

In other embodiments, one or more layers (e.g., pre-filter layer, second layer) and/or the entire filter media may optionally include glass fibers (e.g., microglass and/or chopped glass fibers). For instance, in some embodiments, the weight percentage of the glass fibers in one or more layers and/or the entire filter media may be, for example, greater than or equal to about 0%, greater than or equal to about 10%, greater than or equal to about 25%, greater than or equal to about 50%, or greater than or equal to about 75%. In some instances, the weight percentage of the glass fibers in one or more layers and/or the entire filter media may be less than or equal to about 100%, less than or equal to about 75%, less than or equal to about 50%, less than or equal to about 25%, less than or equal to about 5%, or less than or equal to about 2%. Combinations of the above-referenced ranges are also possible (e.g., greater than or equal to about 0% and less than or equal to about 2%). Other values of weight percentage of the glass in the one or more layers (e.g., pre-filter layer, second layer) and/or the entire filter media are also possible. In some embodiments, one or more layers and/or the entire filter media includes 100% glass fibers.

In some embodiments, one or more layers and/or the entire filter media, in addition to a plurality of fibers, may also include other components, such as a resin, surface treatments, and/or additives. In general, any suitable resin may be used to achieve the desired properties. For example, the resin may be polymeric, water-based, solvent-based, dry strength, and/or wet strength. Typically, any additional components are present in limited amounts, e.g., less than 20% by weight of the resin, less than 10% by weight of the resin, less than 5% by weight of the resin.

In some embodiments, at least a portion of the fibers of one or more layer may be coated with a resin without substantially blocking the pores of the layer. In some embodiments, one or more layers or the entire filter media described herein include a resin.

In some embodiments, the resin may be a binder resin. The binder resin is not in fiber form and is to be distinguished from binder fiber (e.g., multi-component fiber) described above. In general, the binder resin may have any suitable composition. For example, the binder resin may comprise a thermoplastic (e.g., acrylic, polyvinylacetate, polyester, polyamide), a thermoset (e.g., epoxy, phenolic resin), or a combination thereof. In some cases, a binder resin includes one or more of a vinyl acetate resin, an epoxy resin, a polyester resin, a copolyester resin, a polyvinyl alcohol resin, an acrylic resin such as a styrene acrylic resin, and a phenolic resin. Other resins are also possible.

As described further below, the resin may be added to the fibers in any suitable manner including, for example, in the wet state. In some embodiments, the resin coats the fibers and is used to adhere fibers to each other to facilitate adhesion between the fibers. Any suitable method and equipment may be used to coat the fibers, for example, using curtain coating, gravure coating, melt coating, dip coating, knife roll coating, or spin coating, amongst others. In some embodiments, the binder is precipitated when added to the fiber blend. When appropriate, any suitable precipitating agent (e.g., Epichlorohydrin, fluorocarbon) may be provided to the fibers, for example, by injection into the blend. In some embodiments, upon addition to the fibers, the resin is added in a manner such that one or more layer or the entire filter media is impregnated with the resin (e.g., the resin permeates throughout). In a multi-layered web, a resin may be added to each of the layers separately prior to combining the layers, or the resin may be added to the layer after combining the layers. In some embodiments, resin is added to the fibers while in a dry state, for example, by spraying or saturation impregnation, or any of the above methods. In other embodiments, a resin is added to a wet layer.

Filter media described herein may be produced using suitable processes, such as using a wet laid or a non-wet laid process. In some embodiments, a layer and/or the filter media described herein may be produced using a non-wet laid process, such as blowing or spinning process. In some embodiments, a layer (e.g., pre-filter layer, second layer) and/or the entire filter media may be formed by an electro-spinning process. In certain embodiments, a layer (e.g., pre-filter layer, second layer) and/or the entire filter media may be formed by a meltblowing system, such as the meltblown system described in U.S. Publication No. 2009/0120048, filed Nov. 7, 2008, and entitled "Meltblown Filter Medium", and U.S. Publication No. 2012-0152824, filed Dec. 17, 2010, and entitled, "Fine Fiber Filter Media and Processes", each of which is incorporated herein by reference in its entirety for all purposes. In certain embodiments, a layer (e.g., pre-filter layer, second layer) and/or the entire filter media may be formed by a meltspinning or a centrifugal spinning process. In some embodiments, a non-wet laid process, such as an air laid or carding process, may be used to form one or more layers. For example, in an air laid process, synthetic fibers may be mixed, while air is blown onto a conveyor. In a carding process, in some embodiments, the fibers are manipulated by rollers and extensions (e.g., hooks, needles) associated with the rollers. In some cases, forming the layers through a non-wet laid process may be more suitable for the production of a highly porous media. The layer may be impregnated (e.g., via saturation, spraying, etc.) with any suitable resin, as discussed above. In some embodiments, a non-wet laid process (e.g., meltblown, electrospun) may be used to form the pre-filter layer and a wet laid process may be used to from the second layer. The pre-filter layer and the second layer may be combined using any suitable process (e.g., lamination, co-pleating, or collation).

In some embodiments, a layer and/or the filter media described herein may be produced using a wet laid process. In general, a wet laid process involves mixing together of fibers of one or more type; for example, polymeric staple fibers of one type may be mixed together with polymeric staple fibers of another type, and/or with fibers of a different type (e.g., synthetic fibers and/or glass fibers), to provide a fiber slurry. The slurry may be, for example, aqueous-based slurry. In certain embodiments, fibers, are optionally stored separately, or in combination, in various holding tanks prior to being mixed together (e.g., to achieve a greater degree of uniformity in the mixture).

For instance, a first fiber may be mixed and pulped together in one container and a second fiber may be mixed and pulped in a separate container. The first fibers and the second fibers may subsequently be combined together into a single fibrous mixture. Appropriate fibers may be processed through a pulper before and/or after being mixed together. In some embodiments, combinations of fibers are processed through a pulper and/or a holding tank prior to being mixed together. It can be appreciated that other components may also be introduced into the mixture. Furthermore, it should be appreciated that other combinations of fibers types may be used in fiber mixtures, such as the fiber types described herein.

In certain embodiments, a media including two or more layers, such as a pre-filter layer and a second layer is formed by a wet laid process. For example, a first dispersion (e.g., a pulp) containing fibers in a solvent (e.g., an aqueous solvent such as water) can be applied onto a wire conveyor in a papermaking machine (e.g., a fourdrinier or a rotoformer) to form first layer supported by the wire conveyor. A second dispersion (e.g., another pulp) containing fibers in a solvent (e.g., an aqueous solvent such as water) is applied onto the first layer either at the same time or subsequent to deposition of the first layer on the wire. Vacuum is continuously applied to the first and second dispersions of fibers during the above process to remove the solvent from the fibers, thereby resulting in an article containing first and second layers. The article thus formed is then dried and, if necessary, further processed (e.g., calendered) by using known methods to form multi-layered filter media. In some embodiments, such a process may result in a gradient in at least one property across the thickness of the two or more layers.

Any suitable method for creating a fiber slurry may be used. In some embodiments, further additives are added to the slurry to facilitate processing. The temperature may also be adjusted to a suitable range, for example, between 33° F. and 100° F. (e.g., between 50° F. and 85° F.). In some cases, the temperature of the slurry is maintained. In some instances, the temperature is not actively adjusted.

In some embodiments, the wet laid process uses similar equipment as in a conventional papermaking process, for example, a hydropulper, a former or a headbox, a dryer, and an optional converter. After appropriately mixing the slurry in a pulper, the slurry may be pumped into a headbox where the slurry may or may not be combined with other slurries. Other additives may or may not be added. The slurry may also be diluted with additional water such that the final concentration of fiber is in a suitable range, such as for example, between about 0.1% and 0.5% by weight.

In some cases, the pH of the fiber slurry may be adjusted as desired. For instance, fibers of the slurry may be dispersed under generally neutral conditions.

Before the slurry is sent to a headbox, the slurry may optionally be passed through centrifugal cleaners and/or pressure screens for removing unfiberized material. The slurry may or may not be passed through additional equipment such as refiners or deflakers to further enhance the dispersion of the fibers. For example, deflakers may be useful to smooth out or remove lumps or protrusions that may arise at any point during formation of the fiber slurry. Fibers may then be collected on to a screen or wire at an appropriate rate using any suitable equipment, e.g., a fourdrinier, a rotoformer, a cylinder, or an inclined wire fourdrinier.

In some embodiments, a resin is added to a layer (e.g., a pre-formed layer formed by a wet-laid process). For instance, as the layer is passed along an appropriate screen or wire, different components included in the resin (e.g., polymeric binder and/or other components), which may be in the form of separate emulsions, are added to the fiber layer using a suitable technique. In some cases, each component of the resin is mixed as an emulsion prior to being combined with the other components and/or layer. The components included in the resin may be pulled through the layer using, for example, gravity and/or vacuum. In some embodiments, one or more of the components included in the resin may be diluted with softened water and pumped into the layer. In some embodiments, a resin may be applied to a fiber slurry prior to introducing the slurry into a headbox. For example, the resin may be introduced (e.g., injected) into the fiber slurry and impregnated with and/or precipitated on to the fibers. In some embodiments, a resin may be added to a layer by a solvent saturation process.

During or after formation of a filter media, the filter media may be further processed according to a variety of known techniques. For instance, a coating method may be used to include a resin in the filter media. Optionally, additional layers can be formed and/or added to a filter media using processes such as lamination, co-pleating, or collation. For example, in some cases, two layers (e.g., pre-filter layer and the second layer) are formed into a composite article by a wet laid process as described above, and the composite article is then combined with a third layer by any suitable process (e.g., lamination, co-pleating, or collation). It can be appreciated that a filter media or a composite article formed by the processes described herein may be suitably tailored not only based on the components of each layer, but also according to the effect of using multiple layers of varying properties in appropriate combination to form filter media having the characteristics described herein.

As described herein, in some embodiments two or more layers of the filter media (e.g., pre-filter layer and the second layer) may be formed separately and combined by any suitable method such as lamination, collation, or by use of adhesives. The two or more layers may be formed using different processes, or the same process. For example, each of the layers may be independently formed by a non-wet laid process (e.g., meltblown process, melt spinning process, centrifugal spinning process, electrospinning process, dry laid process, air laid process), a wet laid process, or any other suitable process.

Different layers may be adhered together by any suitable method. For instance, layers may be adhered by an adhesive and/or melt-bonded to one another on either side. Lamination and calendering processes may also be used. In some embodiments, an additional layer may be formed from any type of fiber or blend of fibers via an added headbox or a coater and appropriately adhered to another layer.

In some embodiments, further processing may involve pleating the filter media. For instance, two layers may be joined by a co-pleating process. In some cases, the filter media, or various layers thereof, may be suitably pleated by forming score lines at appropriately spaced distances apart from one another, allowing the filter media to be folded. In some cases, one layer can be wrapped around a pleated layer. It should be appreciated that any suitable pleating technique may be used.

In some embodiments, a filter media can be post-processed such as subjected to a corrugation process to increase surface area within the web. In other embodiments, a filter media may be embossed.

The filter media may include any suitable number of layers, e.g., at least 2, at least 3, at least 4, at least 5, at least 6, at least 7 layers. In some embodiments, the filter media may include up to 20 layers.

Filter media described herein may be used in an overall filtration arrangement or filter element. In some embodiments, one or more additional layers or components are included with the filter media. Non-limiting examples of additional layers (e.g., a third layer, a fourth layer) include a meltblown layer, a wet laid layer, a spunbond layer, a carded layer, an air-laid layer, a spunlace layer, a forcespun layer or an electrospun layer.

It should be appreciated that the filter media may include other parts in addition to the one or more layers described herein. In some embodiments, further processing includes incorporation of one or more structural features and/or stiffening elements. For instance, the filter media may be combined with additional structural features such as polymeric and/or metallic meshes. In one embodiment, a screen backing may be disposed on the filter media, providing for further stiffness. In some cases, a screen backing may aid in retaining the pleated configuration. For example, a screen backing may be an expanded metal wire or an extruded plastic mesh.

In some embodiments, a layer described herein may be a non-woven web. A non-woven web may include non-oriented fibers (e.g., a random arrangement of fibers within the web). Examples of non-woven webs include webs made by wet-laid or non-wet laid processes as described herein. Non-woven webs also include papers such as cellulose-based webs.

The filter media may be incorporated into a variety of suitable filter elements for use in various applications including gas and liquid filtration. Filter media suitable for gas filtration may be used for HVAC, HEPA, face mask, and ULPA filtration applications. For example, the filter media may be used in heating and air conditioning ducts. In another example, the filter media may be used for respirator and face mask applications (e.g., surgical face masks, industrial face masks and industrial respirators). Filter elements may have any suitable configuration as known in the art including bag filters and panel filters. Filter assemblies for filtration applications can include any of a variety of filter media and/or filter elements. The filter elements can include the above-described filter media. Examples of filter elements include gas turbine filter elements, dust collector elements, heavy duty air filter elements, automotive air filter elements, air filter elements for large displacement gasoline engines (e.g., SUVs, pickup trucks, trucks), HVAC air filter elements, HEPA filter elements, ULPA filter elements, vacuum bag filter elements, fuel filter elements, and oil filter elements (e.g., lube oil filter elements or heavy duty lube oil filter elements).

Filter elements can be incorporated into corresponding filter systems (gas turbine filter systems, heavy duty air filter systems, automotive air filter systems, HVAC air filter systems, HEPA filter systems, ULPA filter system, vacuum bag filter systems, fuel filter systems, and oil filter systems). The filter media can optionally be pleated into any of a variety of configurations (e.g., panel, cylindrical).

Filter elements can also be in any suitable form, such as radial filter elements, panel filter elements, or channel flow elements. A radial filter element can include pleated filter media that are constrained within two open wire meshes in a cylindrical shape. During use, fluids can flow from the outside through the pleated media to the inside of the radial element.

In some cases, the filter element includes a housing that may be disposed around the filter media. The housing can have various configurations, with the configurations varying based on the intended application. In some embodiments, the housing may be formed of a frame that is disposed around the perimeter of the filter media. For example, the frame may be thermally sealed around the perimeter. In some cases, the frame has a generally rectangular configuration surrounding all four sides of a generally rectangular filter media. The frame may be formed from various materials, including for example, cardboard, metal, polymers, or any combination of suitable materials. The filter elements may also include a variety of other features known in the art, such as stabilizing features for stabilizing the filter media relative to the frame, spacers, or any other appropriate feature.

As noted above, in some embodiments, the filter media can be incorporated into a bag (or pocket) filter element. A bag filter element may be formed by any suitable method, e.g., by placing two filter media together (or folding a single filter media in half), and mating three sides (or two if folded) to one another such that only one side remains open, thereby forming a pocket inside the filter. In some embodiments, multiple filter pockets may be attached to a frame to form a filter element. It should be understood that the filter media and filter elements may have a variety of different constructions and the particular construction depends on the application in which the filter media and elements are used. In some cases, a substrate may be added to the filter media.

The filter elements may have the same property values as those noted above in connection with the filter media. For example, the above-noted gamma values, pressure drop, thicknesses, and/or basis weight may also be found in filter elements.

During use, the filter media mechanically trap contaminant particles on the filter media as fluid (e.g., air) flows through the filter media. The filter media need not be electrically charged to enhance trapping of contamination. Thus, in some embodiments, the filter media are not electrically charged. However, in some embodiments, the filter media may be electrically charged.

Example 1

Figure 2:
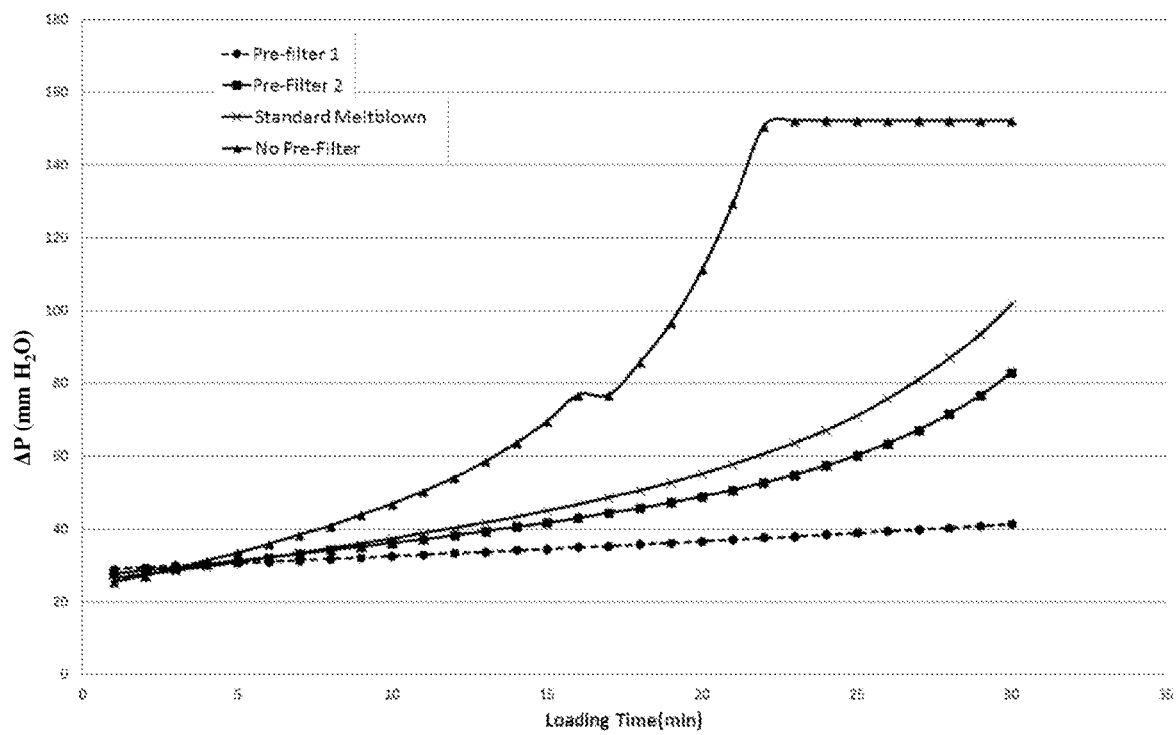
FIG. 2 shows a graph of pressure drop versus loading time for certain filter media, according to one set of embodiments.

This example describes the DOP loading of filter media having various pre-filter layers. The filter media had similar initial pressure drop, initial DOP penetration percentage, and gamma values, but differed in the median fiber diameter and basis weight of the pre-filter layer. Filter media without a pre-filter layer showed very high pressure drop increase due to clogging of pore by aerosols. Filter media having a median fiber diameter of less than or equal to 2 microns and with a basis weight less of than 30 g/m$^2$ had the lowest change in pressure drop over time during DOP loading. The change in pressure drop over time is shown in FIG. 2.

Filter media containing a pre-filter layer, a HEPA efficiency layer, and a pleatable backer layer were formed. The pre-filter layer was upstream and directly adjacent to the HEPA efficiency layer and the pleatable backer layer was the most downstream layer. The HEPA efficiency layer was an electrospun nylon layer which had a median fiber diameter of 250 nm. The HEPA efficiency layer had an initial DOP efficiency of 99.985% and an initial pressure drop of 25.5 mmH$_2$O. The HEPA efficiency layer has a basis weight of 2.2 g/m$^2$. During formation, the electrospun nylon fiber was collected over a wet laid pleatable backer layer, which was passed through the electrospinning line. The pleatable backer contained a blend of polyester fibers and acrylate binder. The pleatable backer layer had a thickness of 0.6 mm and an air permeability of 265 CFM. Other properties of the pleatable backer layer are shown in Table 1. The pleatable backer with efficiency layer was then hand collated with the appropriate pre-filter layer for DOP loading test. Unless otherwise indicated, the structural and performance properties of the layers and entire filter were measured as described herein.

TABLE 1

Properties of the Pleatable Backer Layer

| Basis Wt. | Initial DOP Eff. | Initial ΔP (mmH$_2$O) | Gamma | MD Strength | CD Strength | MD Stiffness | CD Stiffness | Mullen Burst |
|---|---|---|---|---|---|---|---|---|
| 106 g/m$^2$ | 11% | 0.3 | 16 | 36 lbs/in | 9 lbs/in | 2147 mg | 582 mg | 108 psi |

Three different polypropylene pre-filters were combined with the efficiency and pleatable backer layers. The pre-filter layers only differed in their median fiber diameter and basis weight. Pre-filter layers 1 and 2 had a median fiber diameter of less than 1 micron and a basis of weight of less than 30 g/m$^2$. The standard meltblown pre-filter layer had a median fiber diameter of greater than 2 microns and a basis weight of greater than or equal to 30 g/m$^2$. The standard meltblown pre-filter layer was formed using standard meltblowing techniques. However, pre-filters layers 1 and 2 were formed using a meltblowing process to form meltblown fibers having a relatively small diameter. The median fiber diameter of each pre-filter layer, the basis weight of each pre-filter layer, the initial pressure drop of each filter media, the initial DOP penetration of each filter media, and the percent change in pressure drop of each filter media after 30 minutes are shown in Table 2.

TABLE 2

Properties of Filter Media with Various Pre-filter Layers

| Media | Median Fiber Diameter | Basis Wt. (g/m$^2$) | Initial ΔP (mmH$_2$O) | Initial DOP Penetration | Gamma | Change in delta P |
|---|---|---|---|---|---|---|
| No Pre-filter | — | — | 25.5 | 0.019 | 14.59 | 496.86% |
| Pre-filter 1 | 0.85 μm | 10.5 | 29.1 | 0.008 | 14.08 | 42.6% |
| Pre-filter 2 | 0.75 μm | 4 | 27.7 | 0.019 | 13.43 | 199.3% |
| Standard Meltblown | 2.5 μm | 30 | 26.6 | 0.012 | 14.74 | 283.45% |

As shown in Table 2, filter media including a pre-filter layer with a median fiber diameter of less than or equal to 2 microns (i.e., pre-filter layer 1 or 2) had a lower pressure drop increase compared to the filter media lacking a pre-filter layer and the filter media having a pre-filter layer with a median fiber diameter of greater than 2 microns (i.e., standard meltblown). It is expected that the filter media including a pre-filter layer with a median fiber diameter of less than or equal to 2 microns will have a longer service life and lower energy consumption.

In addition, it is believed that the low pressure drop over time observed with pre-filter layers 1 and 2 is due to a reduction in clogging but also the enhanced ability of pre-filter layers 1 and 2 to prevent the DOP particles, which are oil particles, from forming a DOP oil film between the pores during loading. Although, the standard meltblown had a reduced pressure drop increase compared to the filter media without a pre-filter layer, the pressure drop increase observed with the standard meltblown was steeper and higher than filter media containing pre-filter layer 1 or 2. The behavior of the filter media containing the standard meltblown might be due to the formation of a DOP oil film over at least a portion of the pores in a layer and/or the entire filter media, which was suppressed in the filter media containing pre-filter layer 1 or 2.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A filter media, comprising:
   a pre-filter layer comprising first fibers having a median diameter of less than or equal to about 2 microns, the pre-filter layer having a thickness greater than or equal to about 20 microns, wherein the pre-filter layer has a basis weight of less than about 30 g/m$^2$ and an initial DOP efficiency of less than or equal to about 90%; and
   a second layer comprising second fibers having a median diameter of less than or equal to about 1 micron, wherein the second layer has an initial DOP efficiency of greater than or equal to about 60% and wherein the initial DOP efficiency of the second layer is greater than the pre-filter layer.

2. The filter media of claim 1, wherein the first fibers comprise synthetic fibers having a median fiber diameter of greater than or equal to 0.5 microns and less than or equal to 2 microns.

3. The filter media as in claim 1, wherein a surface area of the pre-filter layer is less than or equal to 3 m$^2$/g.

4. The filter media as in claim 1, wherein the initial DOP efficiency of the pre-filter layer is greater than or equal to 30% and less than or equal to 80% when in an uncharged state.

5. The filter media as in claim 1, wherein the first fibers comprise meltblown fibers.

6. The filter media as in claim 1, wherein the median fiber diameter of the second fibers is less than or equal to 0.2 microns.

7. The filter media as in claim 1, wherein the pre-filter layer has a gamma of greater than or equal to 7 and less than or equal to 15 when in an uncharged state.

8. The filter media as in claim 1, wherein the pre-filter layer has a basis weight of greater than or equal to 5 g/m² and less than or equal to 30 g/m².

9. A method comprising filtering a fluid using the filter media of claim 1.

10. The filter media as in claim 1, wherein the second fibers comprise electrospun fibers.

11. The filter media as in claim 1, wherein the second layer has a basis weight of greater than or equal to 0.5 g/m² and less than or equal to 10 g/m².

12. The filter media as in claim 1, wherein the second layer has a thickness of greater than or equal to 0.001 mm and less than or equal to 0.5 mm.

13. The filter media as in claim 1, wherein the second layer has a gamma of greater than or equal to 40 and less than or equal to 75.

14. The filter media as in claim 1, wherein the initial DOP efficiency of the second layer is greater than or equal to 95% and less than or equal to 99.99999%.

15. The filter media as in claim 1, wherein the filter media has a basis weight of greater than or equal to 60 g/m² and less than or equal to 150 g/m².

16. The filter media as in claim 1, wherein the filter media has a thickness of greater than or equal to 0.1 mm and less than or equal to 2 mm.

17. The filter media as in claim 1, wherein:
the first fibers comprise meltblown fibers;
the second fibers comprise electrospun fibers;
the pre-filter layer has a basis weight of greater than or equal to 5 g/m² and less than or equal to 25 g/m²; and
the second layer has a thickness of greater than or equal to 0.001 mm and less than or equal to 0.5 mm.

18. The filter media as in claim 1, wherein:
the first fibers comprise synthetic fibers having a median fiber diameter of greater than or equal to 1 micron and less than or equal to 2 microns;
the thickness of the pre-filter layer is greater than or equal to 0.1 mm;
the second layer has a basis weight of greater than or equal to 0.5 g/m² and less than or equal to 10 g/m²; and
the filter media further comprises a third layer and a fourth layer.

19. The filter media as in claim 1, wherein:
the filter media further comprises a third layer and a fourth layer;
the filter media has a basis weight of greater than or equal to 60 g/m² and less than or equal to 150 g/m²; and
the filter media has a thickness of greater than or equal to 0.1 mm and less than or equal to 2 mm.

20. The filter media as in claim 1, wherein:
the first fibers and second fibers comprise continuous fibers;
the first fibers comprise synthetic fibers having a median fiber diameter of greater than or equal to 1 micron and less than or equal to 2 microns;
wherein the median fiber diameter of the second fibers is less than or equal to about 0.5 microns; and
wherein the median fiber diameter of the first fibers is greater than the median fiber diameter of the second fibers.

* * * * *